US012657552B2

(12) United States Patent

Hodge et al.

(10) Patent No.: US 12,657,552 B2
(45) Date of Patent: Jun. 16, 2026

(54) INVENTORY MANAGEMENT SYSTEM USING IMAGE PROCESSING OF CODES ON SHELVING AND STORAGE BINS

(71) Applicant: DeRoyal Industries, Inc., Powell, TN (US)

(72) Inventors: Gregory S. Hodge, Knoxville, TN (US); Daniel W. Marzahl, Jr., Knoxville, TN (US); Dhanvin S. Desai, Knoxville, TN (US); Kenneth L. Jones, Lenoir City, TN (US); Sallie P. Patrick, Maryville, TN (US); Mark E. McKnight, Knoxville, TN (US); James W. Tucker, Knoxville, TN (US); Joe L. Smith, Powell, TN (US)

(73) Assignee: DeRoyal Industries, Inc., Powell, TN (US)

( * ) Notice: Subject to any disclaimer, the term of this patent is extended or adjusted under 35 U.S.C. 154(b) by 98 days.

(21) Appl. No.: 18/414,925

(22) Filed: Jan. 17, 2024

(65) Prior Publication Data

US 2024/0338651 A1      Oct. 10, 2024

Related U.S. Application Data

(63) Continuation-in-part of application No. 18/131,056, filed on Apr. 5, 2023.

(51) Int. Cl.
*G06Q 10/087* (2023.01)
*G06K 19/06* (2006.01)
(Continued)

(52) U.S. Cl.
CPC ..... *G06Q 10/087* (2013.01); *G06K 19/06037* (2013.01); *G06T 7/13* (2017.01); *G06T 7/73* (2017.01)

(58) Field of Classification Search
CPC .. G06Q 10/087; G06K 19/06037; G06T 7/13; G06T 7/73
See application file for complete search history.

(56) References Cited

U.S. PATENT DOCUMENTS 3,983,822 A     10/1976  Suttles
9,171,278 B1 *  10/2015  Kong ..................... B65G 1/137
(Continued)

FOREIGN PATENT DOCUMENTS

WO          2021216329 A1    10/2021
WO     WO-2022081518 A2 *   4/2022   ............. G06V 20/52
WO     WO-2022235637 A1 *  11/2022   ............. H04N 23/90

OTHER PUBLICATIONS

Kari Rodriquez Authorized Officer, Notice of Transmittal of the International Search Report and Written Opinion (PCT Rule 44.1), ISA/US Alexandria, VirginiaPCT/US24/22944, Date of mailing Aug. 30, 2024.

*Primary Examiner* — Michael Jared Walker
(74) *Attorney, Agent, or Firm* — Luedeka Neely, P.C.

(57) ABSTRACT

An apparatus for monitoring and replenishing an inventory of goods includes a first inventory area and a first movable structure having a first optical code associated with the first distinct inventory area. The first movable structure is placed in a replenishment signaling area after a supply of goods in the inventory area is depleted. Boundary optical codes are disposed near a boundary of the replenishment signaling area. A camera generates periodic images of the replenishment signaling area and the boundary optical codes. A computer processor detects the boundary optical codes in the images and determines a boundary line of the replenishment signaling area based thereon. The processor determines a spatial relationship between the first optical code and the boundary line in the images and generates a replenishment notification based on the spatial relationship. The replenish- (Continued)

ment notification indicates that the supply of the first type of goods needs to be replenished.

24 Claims, 11 Drawing Sheets

(51) Int. Cl.
 *G06T 7/13*    (2017.01)
 *G06T 7/73*    (2017.01)

(56) References Cited

U.S. PATENT DOCUMENTS

| | | | | |
|---|---|---|---|---|
| 9,262,741 | B1 * | 2/2016 | Williams | G06Q 30/0635 |
| 10,384,869 | B1 * | 8/2019 | Shiee | H04N 23/951 |
| 10,783,491 | B2 * | 9/2020 | Buibas | G06V 20/52 |
| 10,846,859 | B1 * | 11/2020 | Stahl | G06K 19/06037 |
| 10,885,632 | B1 * | 1/2021 | Stahl | G06T 7/80 |
| 10,963,658 | B1 * | 3/2021 | Bloch | G06V 10/42 |
| 11,475,470 | B2 * | 10/2022 | Bronicki | G06Q 30/0281 |
| 11,538,313 | B2 * | 12/2022 | Bronicki | G07G 1/0072 |
| 11,562,581 | B2 * | 1/2023 | Adato | G06F 16/583 |
| 11,972,394 | B2 * | 4/2024 | Nakamoto | G06Q 10/087 |
| 12,008,874 | B2 * | 6/2024 | Adato | H04N 23/65 |
| 12,205,075 | B2 * | 1/2025 | Ellison | G06N 20/00 |
| 2005/0234580 | A1 * | 10/2005 | Roldan | G06Q 10/087 |
| | | | | 700/106 |
| 2008/0077511 | A1 * | 3/2008 | Zimmerman | G06Q 10/087 |
| | | | | 705/28 |
| 2009/0319399 | A1 * | 12/2009 | Resta | G06Q 10/087 |
| | | | | 705/28 |
| 2017/0255899 | A1 * | 9/2017 | Taira | G06K 7/1413 |
| 2017/0305669 | A1 * | 10/2017 | Tsai | B65G 1/137 |
| 2017/0316372 | A1 * | 11/2017 | Thompson | G06F 16/252 |
| 2018/0060943 | A1 * | 3/2018 | Mattingly | G06Q 20/12 |
| 2018/0144097 | A1 | 5/2018 | Moore | |
| 2019/0149725 | A1 * | 5/2019 | Adato | H04N 1/00 |
| | | | | 348/158 |
| 2020/0003000 | A1 * | 1/2020 | Savage | E05B 49/00 |
| 2020/0118077 | A1 * | 4/2020 | Schumacher | H04N 23/698 |
| 2021/0074101 | A1 * | 3/2021 | Pertz | G07F 19/205 |
| 2022/0027841 | A1 * | 1/2022 | Mitchell | G06K 19/08 |
| 2022/0106122 | A1 * | 4/2022 | Tie | B65G 1/0407 |
| 2022/0172549 | A1 * | 6/2022 | Chung | G06Q 20/3278 |
| 2022/0207470 | A1 * | 6/2022 | Fisher | G06N 3/08 |
| 2022/0245584 | A1 * | 8/2022 | Polager | G08B 13/246 |
| 2023/0124850 | A1 * | 4/2023 | Adato | H04N 23/80 |
| | | | | 382/141 |
| 2024/0043212 | A1 * | 2/2024 | Douglas | B25J 9/0093 |

* cited by examiner (End view of shelving unit)

(Front view of shelving unit)

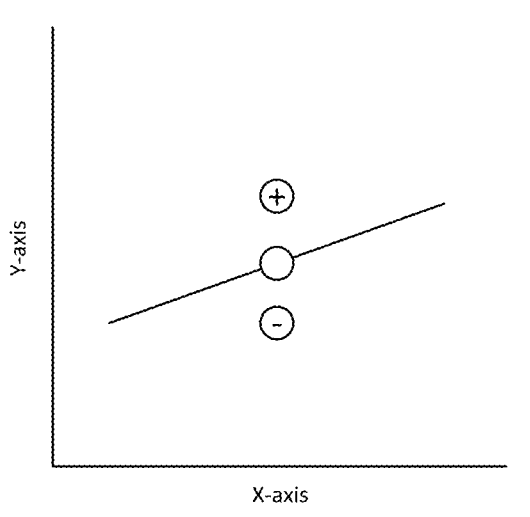
Normal Algebra
$\oplus$  Any point with a higher y value at a given
x value is above the line.
$\ominus$  Any point with a lower y value at a given
x value is below the line.
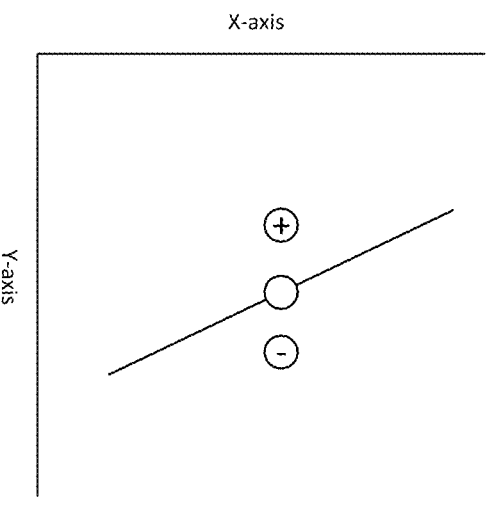
Image Coordinates
$\oplus$  Any point with a lower y value at a given
x value is above the line.
$\ominus$  Any point with a higher y value at a given
x value is below the line.
FIG. 9

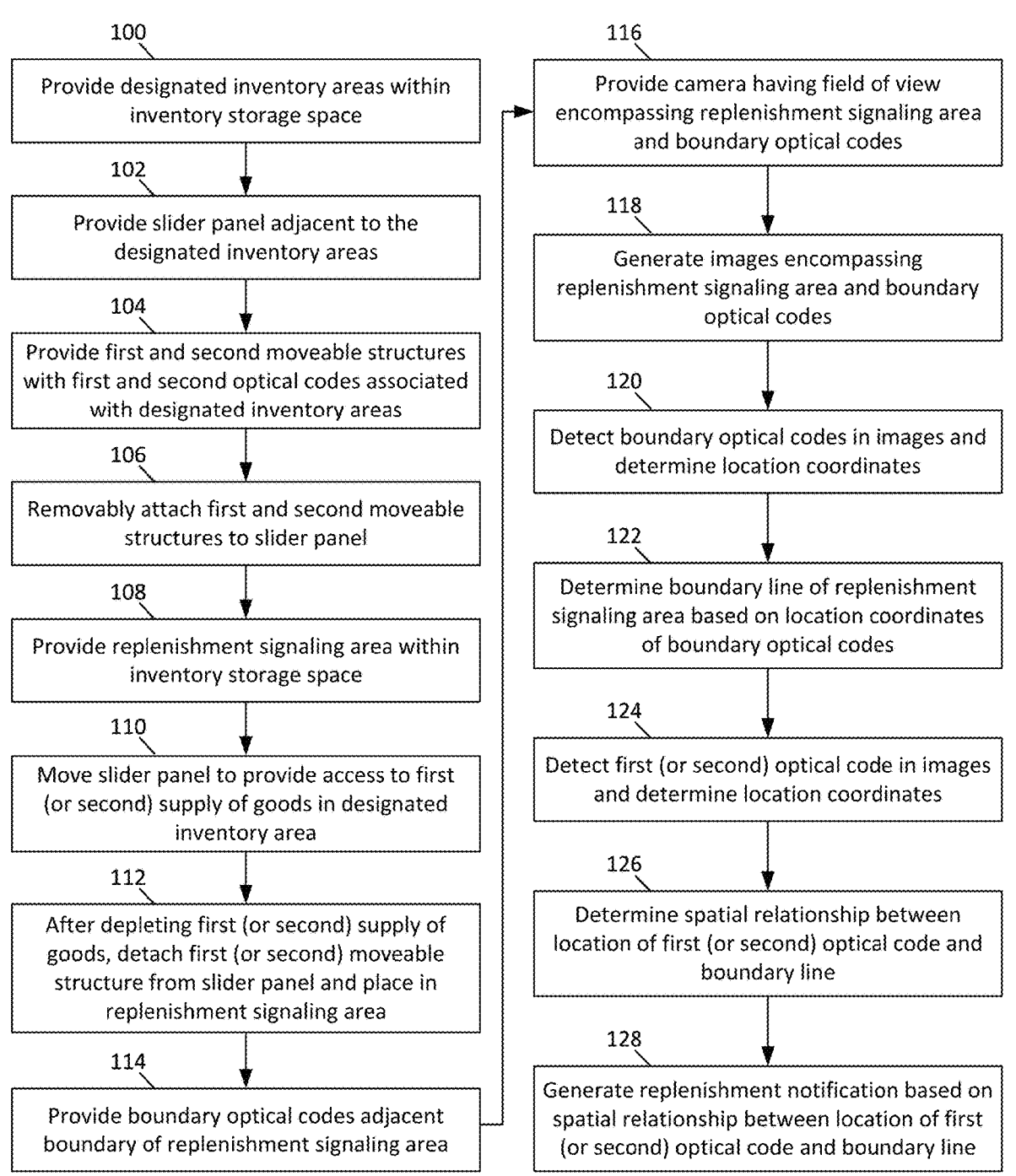

100
Provide designated inventory areas within inventory storage space

102
Provide slider panel adjacent to the designated inventory areas

104
Provide first and second moveable structures with first and second optical codes associated with designated inventory areas

106
Removably attach first and second moveable structures to slider panel

108
Provide replenishment signaling area within inventory storage space

110
Move slider panel to provide access to first (or second) supply of goods in designated inventory area

112
After depleting first (or second) supply of goods, detach first (or second) moveable structure from slider panel and place in replenishment signaling area

114
Provide boundary optical codes adjacent boundary of replenishment signaling area

116
Provide camera having field of view encompassing replenishment signaling area and boundary optical codes

118
Generate images encompassing replenishment signaling area and boundary optical codes

120
Detect boundary optical codes in images and determine location coordinates

122
Determine boundary line of replenishment signaling area based on location coordinates of boundary optical codes

124
Detect first (or second) optical code in images and determine location coordinates

126
Determine spatial relationship between location of first (or second) optical code and boundary line

128
Generate replenishment notification based on spatial relationship between location of first (or second) optical code and boundary line

*FIG. 11*

INVENTORY MANAGEMENT SYSTEM USING IMAGE PROCESSING OF CODES ON SHELVING AND STORAGE BINS

FIELD OF THE INVENTION

This invention relates to the field of inventory management. More particularly, this invention relates to processing images of codes on shelving units and storage bins in a Kanban inventory management system.

BACKGROUND OF THE INVENTION

In the context of this application, Kanban refers to a means of supporting pull-based replenishment in an inventory management system. Kanban (pronounced "Kahn-Bahn") is a Japanese term for "signal," such as an inventory replenishment signal. Generally, Kanban systems are used to manage the supply of low-to-medium cost inventory items that have relatively constant demand, so as to reduce the chance of running out of such supplies. It also creates FIFO (First In, First Out) for inventory to help avoid expired supplies. Traditional Kanban requires staff labor to conduct either a physical count or a visual order, or to manually place a paper Kanban card into a reorder bin, or to move an empty bin from a lower shelf on a shelving unit to the top shelf or other location to trigger a replenishment signal.

What is needed is a system that can provide a complete, imaging-based inventory management solution that employs the Kanban methodology while reducing the need for human interaction in the system.

SUMMARY OF THE INVENTION

The above and other needs are met by an apparatus for monitoring and replenishing an inventory of goods disposed within an inventory storage space. The apparatus includes a first distinct inventory area within the inventory storage space that is configured to store a supply of a first type of goods. A first optical code is disposed on a first movable structure associated with the first distinct inventory area. The first optical code encodes a first unique identification number that identifies the first type of goods. The apparatus also includes a replenishment signaling area configured to receive the first movable structure that is placed there after the supply of the first type of goods stored in the first distinct inventory area has been depleted. One or more boundary optical codes are disposed adjacent to a boundary of the replenishment signaling area.

The apparatus also includes one or more cameras that each have a field of view at least partially encompassing the replenishment signaling area and the boundary optical codes. The one or more cameras generate periodic images of the replenishment signaling area and the boundary optical codes. One or more processors execute programmed instructions to detect the boundary optical codes that are present within the images and to determine location coordinates of the detected boundary optical codes. A boundary line associated with the boundary of the replenishment signaling area is determined based on the location coordinates of the boundary optical codes. The first optical code is detected within the images and the location coordinates of the first optical code are determined. Based on the location coordinates of the first optical code, a spatial relationship between the location of the first optical code and the boundary line is determined. A replenishment notification is generated based at least in part on the spatial relationship between the location of the first optical code and the boundary line. The replenishment notification indicates that the supply of the first type of goods in the first distinct inventory area needs to be replenished.

In some embodiments, the apparatus includes a multi-shelf shelving unit having a top shelf that serves as the replenishment signaling area. In these embodiments, the boundary optical codes include a first boundary optical code disposed adjacent to a first end of the top shelf, and a second boundary optical code disposed adjacent to a second end of the top shelf opposing the first end. The one or more processors execute the programmed instructions to determine the boundary line to coincide with the location coordinates of the first and second boundary optical codes, and to generate the replenishment notification based at least in part on the location of the first optical code being above the boundary line.

In some embodiments, the first movable structure comprises a first bin, and the first optical code is attached to the first bin and is within the field of view of the one or more cameras, and the first distinct inventory area is disposed within the first bin.

In some embodiments, the first movable structure comprises a bookend, and the first optical code is attached to the bookend and is within the field of view of the one or more cameras, and the first distinct inventory area comprises a portion of a lower shelf of the multi-shelf shelving unit that is below the top shelf.

In some embodiments, the first distinct inventory area comprises a first portion of a shelf of a multi-shelf shelving unit, and the replenishment signaling area comprises a second portion of the shelf, wherein the boundary of the replenishment signaling area is disposed between the first and second portions of the shelf. In these embodiments, the one or more boundary optical codes comprise a first boundary optical code disposed on an upper portion of the shelving unit and a second boundary optical code disposed on a lower portion of the shelving unit. The one or more processors execute the programmed instructions to determine the boundary line associated with the boundary to coincide with the location coordinates of the first and second boundary optical codes and generate the replenishment notification based at least in part on the location of the first optical code being offset to one side of the boundary line which indicates that the first optical code is within the replenishment signaling area.

In some embodiments, the one or more processors execute the programmed instructions to determine the boundary line to comprise a horizontal line, a vertical line, a diagonal line, a curved line, or a line forming a closed shape.

In some embodiments, the one or more processors execute the programmed instructions to determine the boundary line as intersecting the location coordinates of the one or more boundary optical codes.

In some embodiments, the first optical code and the one or more boundary optical codes comprise QR codes, barcodes, or color codes.

In some embodiments, the one or more cameras comprise a camera mounted on a ceiling, a camera mounted on a horizontal or vertical track system, an infrared camera, or a camera having remotely-adjustable zoom, tilt and pan.

In some embodiments, at least one of the processors is disposed in the inventory storage space.

In some embodiments, at least one of the processors is a cloud-based server that is in communication with a processor disposed in the inventory storage space via a communication network.

In some embodiments, the one or more processors execute the programmed instructions to decode the first optical code to determine the first unique identification number that identifies the first type of goods, and to generate the replenishment notification to include the first unique identification number.

In some embodiments, the one or more processors execute the programmed instructions to maintain a state machine representing a plurality of states of the first distinct inventory area.

The plurality of states include:

a first state in which the first optical code is not in the replenishment signaling area;

a second state in which the first optical code is in the replenishment signaling area; and a third state in which an order has been placed or is to be placed to replenish the supply of the first type of goods in the first distinct inventory area.

The execution of the programmed instructions causes:

a transition from the first state to the second state based on detecting the first optical code in the replenishment signaling area;

a transition from the second state to the third state and generation of a replenishment notification in association with the transition from the second state to the third state, wherein the replenishment notification indicates that the supply of the first type of goods in the first distinct inventory area needs to be replenished; and a transition from the third state to the first state based on not detecting the first optical code in the replenishment signaling area for at least a predetermined period of time.

In another aspect, the invention provides a method for monitoring and replenishing an inventory of goods disposed within an inventory storage space. In a preferred embodiment, the method includes:

designating a first distinct inventory area within the inventory storage space that is configured to store a supply of a first type of goods;

providing a first movable structure associated with the first distinct inventory area, wherein the first movable structure has a first optical code that encodes a first unique identification number that identifies the first type of goods;

designating a replenishment signaling area within the inventory storage space that is configured to receive the first movable structure;

placing the first movable structure into the replenishment signaling area after the supply of the first type of goods stored in the first distinct inventory area has been depleted;

providing one or more boundary optical codes adjacent to a boundary of the replenishment signaling area;

periodically generating optical images that encompass the replenishment signaling area and the boundary optical codes;

executing programmed instructions on one or more processors to detect the boundary optical codes present within the images;

executing programmed instructions to determine location coordinates of the boundary optical codes detected within the images;

executing programmed instructions to determine a boundary line associated with the boundary of the replenishment signaling area based on the location coordinates of the boundary optical codes;

executing programmed instructions to detect the first optical code present within the images;

executing programmed instructions to determine location coordinates of the first optical code detected within the images;

executing programmed instructions to determine a spatial relationship between a location of the first optical code and the boundary line based on the location coordinates of the first optical code; and executing programmed instructions to generate a replenishment notification based at least in part on the spatial relationship between the location of the first optical code and the boundary line, wherein the replenishment notification indicates that the supply of the first type of goods in the first distinct inventory area needs to be replenished.

In yet another aspect, the invention provides an apparatus for monitoring and replenishing an inventory of goods disposed within an inventory storage space. The apparatus includes a first distinct inventory area within the inventory storage space that is configured to store a supply of a first type of goods. A first electronically detectable element is disposed on a first movable structure associated with the first distinct inventory area. The first electronically detectable clement encodes a first unique identification number that identifies the first type of goods. A replenishment signaling area is disposed within the inventory storage space and is configured to receive the first movable structure that is placed therein after the supply of the first type of goods stored in the first distinct inventory area has been depleted. One or more detectors associated with the replenishment signaling area are configured to detect the first electronically detectable element. One or more processors, which are in electrical communication with the one or more detectors, are operable to execute programmed instructions to maintain a state machine representing a plurality of states of the first distinct inventory area. The plurality of states include a first state in which the first electronically detectable element is not in the replenishment signaling area, a second state in which the first electronically detectable element is in the replenishment signaling area, and a third state in which an order has been placed or is to be placed to replenish the supply of the first type of goods in the first distinct inventory area. Execution of the programmed instructions causes:

a transition from the first state to the second state based on the one or more detectors detecting the first electronically detectable element in the replenishment signaling area;

a transition from the second state to the third state and generation of a replenishment notification in association with the transition from the second state to the third state, wherein the replenishment notification indicates that the supply of the first type of goods in the first distinct inventory area needs to be replenished; and a transition from the third state to the first state based on the one or more detectors in the replenishment signaling area not detecting the first electronically detectable element in the replenishment signaling area for at least a predetermined period of time.

In some embodiments, the apparatus includes a multi-shelf shelving unit disposed within the inventory storage space, wherein the replenishment signaling area comprises a top shelf of the multi-shelf shelving unit.

In some embodiments, the first movable structure comprises a first bin, the first electronically detectable element is attached to the first bin, and the first distinct inventory area is disposed within the first bin.

In some embodiments, the first movable structure comprises a bookend, the first electronically detectable element is attached to the bookend, and the first distinct inventory area comprises a portion of a lower shelf of the multi-shelf shelving unit that is below the top shelf.

In some embodiments, the apparatus includes a multi-shelf shelving unit disposed within the inventory storage space, the first distinct inventory area comprises a first portion of a shelf of the multi-shelf shelving unit, and the replenishment signaling area comprises a second portion of the shelf of the multi-shelf shelving unit.

In some embodiments, the first electronically detectable element comprises a QR code, a barcode, or an RFID tag.

In some embodiments, the one or more detectors comprise one or more cameras or one or more RFID tag readers.

In some embodiments, the one or more processors execute the programmed instructions to decode the first electronically detectable element to determine the first unique identification number that identifies the first type of goods, and to generate the replenishment notification to include the first unique identification number In yet another aspect, an embodiment is directed to an apparatus for monitoring and replenishing an inventory of goods disposed within an inventory storage space that includes first and second inventory areas. The first inventory area is configured to store a first supply of goods and the second inventory area is configured to store a second supply of the goods. A slider panel is disposed within the inventory storage space and adjacent to the first and second inventory areas. The slider panel is configured to be moveable between a first position in which the slider panel allows access to the first inventory area and blocks access to the second inventory area, and a second position in which the slider panel allows access to the second inventory area and blocks access to the first inventory area. A first movable structure is removably attached to the slider panel, and a first optical code is disposed on the first movable structure. The first optical code encodes a unique identification number that identifies the goods in the first supply of goods. A second movable structure is also removably attached to the slider panel, and a second optical code is disposed on the second movable structure. The second optical code encodes the unique identification number that identifies the goods in the second supply of goods.

The apparatus includes a replenishment signaling area within the inventory storage space. The replenishment signaling area is configured to receive the first movable structure that is placed therein after the first supply of the goods stored in the first inventory area has been depleted. The replenishment signaling area is also configured to receive the second movable structure that is placed therein after the second supply of the goods stored in the second inventory area has been depleted. One or more boundary optical codes are disposed adjacent to a boundary of the replenishment signaling area.

The apparatus includes one or more cameras that each have a field of view at least partially encompassing the replenishment signaling area and the one or more boundary optical codes. The one or more cameras generate images of the replenishment signaling area and the one or more boundary optical codes. One or more processors, which are in electrical communication with the one or more cameras, execute programmed instructions to:

detect the one or more boundary optical codes present within the images;

determine location coordinates of the one or more boundary optical codes detected within the images;

based on the location coordinates of the one or more boundary optical codes, determine a boundary line associated with the boundary of the replenishment signaling area;

detect the first or second optical code present within the images;

determine location coordinates of the first or second optical codes detected within the images;

based on the location coordinates of the first or second optical codes, determine a spatial relationship between a location of the first or second optical code and the boundary line;

generate a first replenishment notification based at least in part on the spatial relationship between the location of the first optical code and the boundary line, wherein the first replenishment notification indicates that the first supply of the goods in the first inventory area needs to be replenished; and generate a second replenishment notification based at least in part on the spatial relationship between the location of the second optical code and the boundary line, wherein the second replenishment notification indicates that the second supply of the goods in the second inventory area needs to be replenished.

In some embodiments, the apparatus includes a multi-shelf shelving unit having a top shelf and one or more lower shelves below the top shelf. In this embodiment, the replenishment signaling area is disposed on the top shelf of the multi-shelf shelving unit, and the first and second inventory areas are disposed on the one or more lower shelves. The one or more boundary optical codes include a first boundary optical code disposed adjacent to a first end of the top shelf and a second boundary optical code disposed adjacent to a second end of the top shelf opposing the first end. The one or more processors execute programmed instructions to determine the boundary line as coinciding with the location coordinates of the first and second boundary optical codes, to generate the first replenishment notification based on the location of the first optical code being above the boundary line, and to generate the second replenishment notification based on the location of the second optical code being above the boundary line.

In some embodiments, the apparatus includes a substantially vertical structure disposed above the boundary line and within the field of view of the one or more cameras. In these embodiments, the first movable structure comprises a first label on which the first optical code is disposed, and the second movable structure comprises a second label on which the second optical code is disposed. The first and second labels can be removably attached to the slider panel and removably attached to the vertical structure.

In some embodiments, the substantially vertical structure and the slider panel include attachment mechanisms for removably attaching the first and second labels to the vertical structure and the slider panel. The one or more attachment mechanisms comprise one or more of a hook-and-loop mechanism, a magnetic mechanism, and a snap mechanism.

In yet another aspect, an embodiment of the invention is directed to a method for monitoring and replenishing an inventory of goods disposed within an inventory storage space. The method includes:

(a) providing a first inventory area configured to store a first supply of goods within the inventory storage space;

(b) providing a second inventory area configured to store a second supply of the goods within the inventory storage space;

(c) providing a slider panel adjacent the first and second inventory areas within the inventory storage space;

(d) providing a first movable structure associated with the first inventory area, the first movable structure having a first optical code disposed thereon, the first optical code encoding a unique identification number that identifies the goods;

(e) removably attaching the first movable structure to the slider panel;

(f) providing a replenishment signaling area within the inventory storage space, the replenishment signaling area configured to receive the first movable structure;

(g) moving the slider panel to a first position in which the slider panel provides access to the first supply of goods in the first inventory area and blocks access to the second supply of goods in the second inventory area;

(h) upon depletion of the first supply of the goods from in the first inventory area, removing the first movable structure from the slider panel and placing the first movable structure in the replenishment signaling area;

(i) providing one or more boundary optical codes adjacent to a boundary of the replenishment signaling area;

(j) providing one or more cameras that each have a field of view at least partially encompassing the replenishment signaling area and the one or more boundary optical codes;

(k) using the one or more cameras, periodically generating images that encompass the replenishment signaling area and the one or more boundary optical codes;

(l) executing programmed instructions on one or more processors to detect the one or more boundary optical codes present within the images;

(m) executing programmed instructions on the one or more processors to determine location coordinates of the one or more boundary optical codes detected within the images;

(n) executing programmed instructions on the one or more processors to determine a boundary line associated with the boundary of the replenishment signaling area based on the location coordinates of the one or more boundary optical codes;

(o) executing programmed instructions on the one or more processors to detect the first optical code present within the images;

(p) executing programmed instructions on the one or more processors to determine location coordinates of the first optical code detected within the images;

(q) executing programmed instructions on the one or more processors to determine a spatial relationship between a location of the first optical code and the boundary line based on the location coordinates of the first optical code; and (r) executing programmed instructions on the one or more processors to generate a replenishment notification based at least in part on the spatial relationship between the location of the first optical code and the boundary line, wherein the replenishment notification indicates that the first supply of the goods in the first inventory area needs to be replenished.

In some embodiments the method also includes:

(s) providing a second movable structure associated with the second inventory area, the second movable structure having a second optical code disposed thereon, the second optical code encoding the unique identification number that identifies the goods;

(t) removably attaching the second movable structure to the slider panel;

(u) moving the slider panel to a second position in which the slider panel provides access to the second supply of goods in the second inventory area and blocks access to the first inventory area;

(v) upon depletion of the second supply of the goods stored in the second inventory area, removing the second movable structure from the slider panel, and placing the second movable structure into the replenishment signaling area;

(w) executing programmed instructions on the one or more processors to detect the second optical code present within the images;

(x) executing programmed instructions on the one or more processors to determine location coordinates of the second optical code detected within the images;

(y) executing programmed instructions on the one or more processors to determine a spatial relationship between a location of the second optical code and the boundary line based on the location coordinates of the second optical code; and (z) executing programmed instructions on the one or more processors to generate a replenishment notification based at least in part on the spatial relationship between the location of the second optical code and the boundary line, wherein the replenishment notification indicates that the second supply of the goods in the second inventory area needs to be replenished.

In some embodiments, step (f) comprises providing a top shelf of a multi-shelf shelving unit as the replenishment signaling area;

step (i) comprises providing a first boundary optical code disposed adjacent to a first end of the top shelf and providing a second boundary optical code disposed adjacent to a second end of the top shelf opposing the first end;

step (n) comprises executing programmed instructions on the one or more processors to determine the boundary line to coincide with the location coordinates of the first and second boundary optical codes; and step (r) comprises executing programmed instructions on the one or more processors to generate the replenishment notification based at least in part on the location of the first optical code being above the boundary line.

In some embodiments, the method includes providing a substantially vertical structure disposed above the boundary line and within the field of view of the one or more cameras, wherein:

step (d) comprises providing a first label on which the first optical code is disposed, wherein the first label is removably attachable to the slider panel and removably attachable to the vertical structure; and step(s) comprises providing a second label on which the second optical code is disposed, wherein the second label is removably attachable to the slider panel and removably attachable to the vertical structure.

In some embodiments, the substantially vertical structure and the slider panel include mechanisms for removably attaching the first and second labels to the vertical structure and the slider panel. The attachment mechanisms may comprise a hook-and-loop mechanism, a magnetic mechanism, or a snap mechanism.

In another aspect, embodiments are directed to an apparatus that implements a state machine for monitoring and replenishing an inventory of goods. The goods are stored in an inventory storage space that includes a first distinct inventory area and a replenishment signaling area. The first distinct inventory area is configured to store a supply of a first type of goods. A first movable structure associated with the first distinct inventory area includes a first electronically detectable element that encodes a first unique identification number that identifies the first type of goods. The replenishment signaling area is configured to receive the first movable structure when it is placed therein after the supply of the first type of goods stored in the first distinct inventory area has been depleted. One or more detectors are configured to detect the first electronically detectable element within the replenishment signaling area. One or more processors are operable to execute programmed instructions to maintain the state machine representing a plurality of states of the first distinct inventory area, including:

a first state in which the first electronically detectable element is not in the replenishment signaling area;

a second state in which the first electronically detectable element is in the replenishment signaling area; and a third state in which an order has been placed or is to be placed to replenish the supply of the first type of goods in the first distinct inventory area.

Execution of the programmed instructions causes:

a transition from the first state to the second state based on the one or more detectors detecting the first electronically detectable element in the replenishment signaling area;

a transition from the second state to the third state and generation of a replenishment notification in association with the transition from the second state to the third state, wherein the replenishment notification indicates that the supply of the first type of goods in the first distinct inventory area needs to be replenished;

a transition from the third state to the first state based on the one or more detectors in the replenishment signaling area not detecting the first electronically detectable element in the replenishment signaling area for at least a predetermined period of time; and a transition from the third state to the second state based on:

(1) a line item of a reordering requisition associated with the first type of goods being designated as filled;

(2) passage of more than a threshold level of time after the line item of the reordering requisition associated with the first type of goods was designated as filled; and (3) the first electronically detectable element is still detected in the replenishment signaling area.

BRIEF DESCRIPTION OF THE DRAWINGS

Other embodiments of the invention will become apparent by reference to the detailed description in conjunction with the figures, wherein elements are not to scale so as to show the details more clearly, wherein like reference numbers indicate like elements throughout the several views, and wherein:

FIG. 9 depicts a normal two-dimensional algebraic coordinate system compared with a two-dimensional image pixel coordinate system;

FIG. 11 depicts a method for implementing the inventory management system shown in FIGS. 10A-10C.

DETAILED DESCRIPTION

Figure 1:
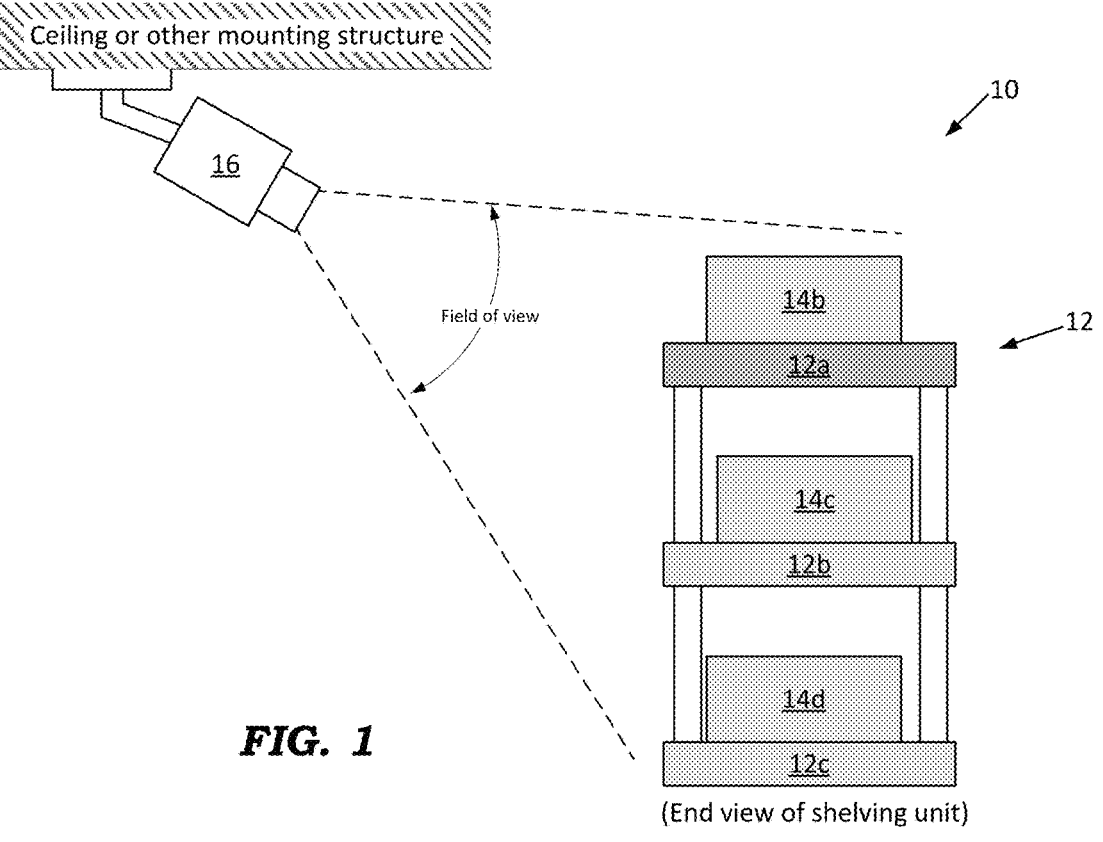
FIGS. 1 and 2 depict a physical configuration of an inventory management system according to an embodiment of the invention.
Figure 2:
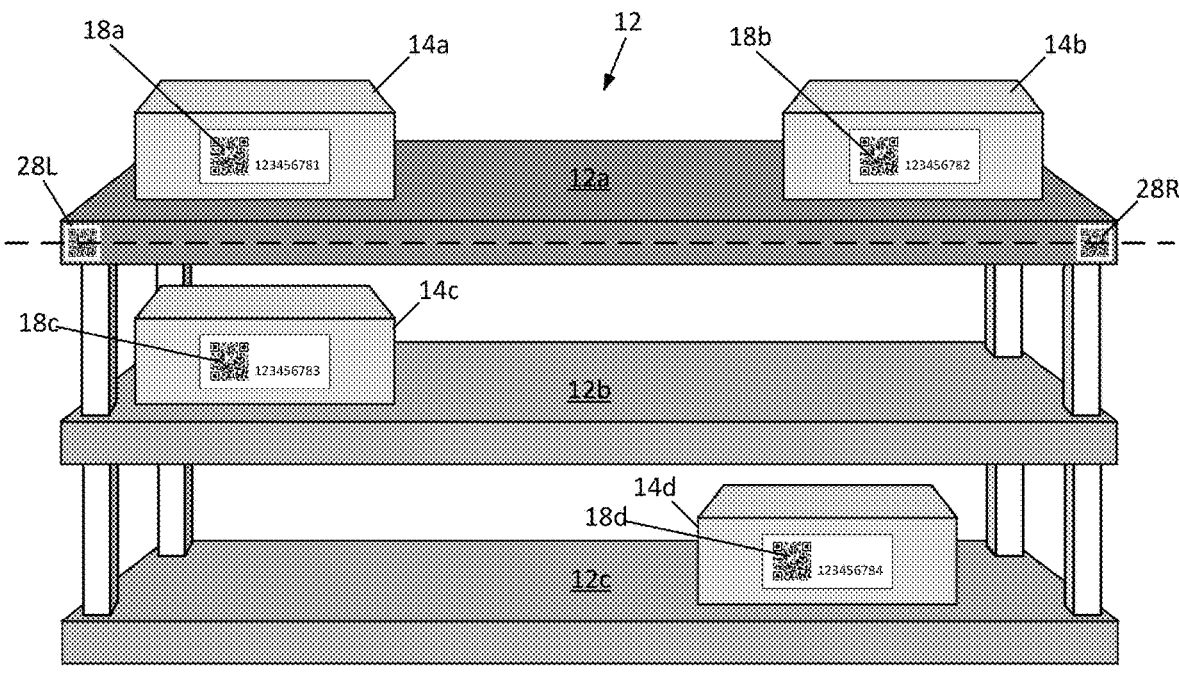

As shown in FIGS. 1 and 2, an inventory management system 10 includes an inventory shelving unit 12 having multiple shelves 12a, 12b, 12c on which bins 14a, 14b, 14c, 14d are placed for holding inventory items in an inventory room. An end view of the shelving unit 12 is depicted in FIG. 1 and a front view is depicted in FIG. 2. It will be appreciated that the shelving unit 12 may include fewer or more than the number of shelves depicted in FIGS. 1 and 2.

A storage bin, such as the bins 14a-14d, is one example of a distinct inventory area in which inventory may be stored while awaiting use. A portion of a shelf is another example of a distinct inventory area.

In one version of a Kanban inventory replenishment system, bins that contain inventory items are kept on the lower shelves, such as shelves 12b and 12c, whereas the top shelf 12a is reserved for the placement of empty bins. The placement of an empty bin on the top shelf is a "signal" that replenishment of inventory is needed. In conventional Kanban systems, prompted by this signal, a person responsible for maintaining the stock of supplies in the inventory room would take action to reorder or otherwise obtain resupply of the items associated with an empty bin placed on the top shelf. In such prior systems, the responsible person would have to take some manual action to initiate the reorder/resupply process.

The top shelf of a shelving unit is one example of the replenishment signaling area in which the placement of an optically encoded structure causes generation of a replenishment signal. This area is also referred to herein as a "landing zone." It will be appreciated that another area besides the top shelf of a shelving unit may be designated as the replenishment signaling area. For example, a left or right portion of any of the shelves of the shelving unit may be so designated, or a separate structure altogether may be so designated, such as a table, countertop, or cart.

In a preferred embodiment of the present disclosure, one or more cameras 16 are mounted to the ceiling or other mounting structure within an inventory storage room in which the shelving unit 12 is located. Preferably, each camera 16 is positioned such that it has a field of view that encompasses all or a portion of the shelves 12a-12c of the unit 12, such as the view depicted in FIG. 2. The positioning of each camera 16 should take into account the distance and the angle of the camera 16 with respect to the shelving unit 12. In some embodiments, the field of view of at least one camera 16 may encompass only the top shelf 12a. In some embodiments, one or more of the cameras 16 are mounted on a horizontal and/or vertical track system that provides for moving the position of the camera(s) 16 with respect to one or more shelving units 12. This enables the system to capture images of more shelving space with fewer cameras. In some embodiments, one or more of the cameras 16 include infrared capabilities for operating in low light conditions. In some embodiments, one or more of the cameras 16 may include other features such as remotely-adjustable zoom, tilt and pan.

Each camera 16 is in communication with a processor 20 that is operable to periodically capture images corresponding to the camera's field of view. The connection between the camera(s) 16 and the processor 20 may be wired or wireless, such as via a communication network. In a preferred embodiment, each captured image comprises a rectangular grid of x number of pixels by y number of pixels. The captured image is of sufficient quality and resolution to allow processing of the image to extract optical codes therefrom reliably and accurately.

As shown in FIG. 2, each bin 14a-14d includes an electronically detectable element, such as an optical code 18a-18d, disposed on a visible portion of the bin. In some embodiments, the optical codes 18a-18d are QR codes or bar codes. In an alternative embodiment, the electronically detectable elements are RFID tags attached to the bins. In the RFID embodiment, RFID readers are employed to detect and decode information encoded in the tags.

Figure 3:
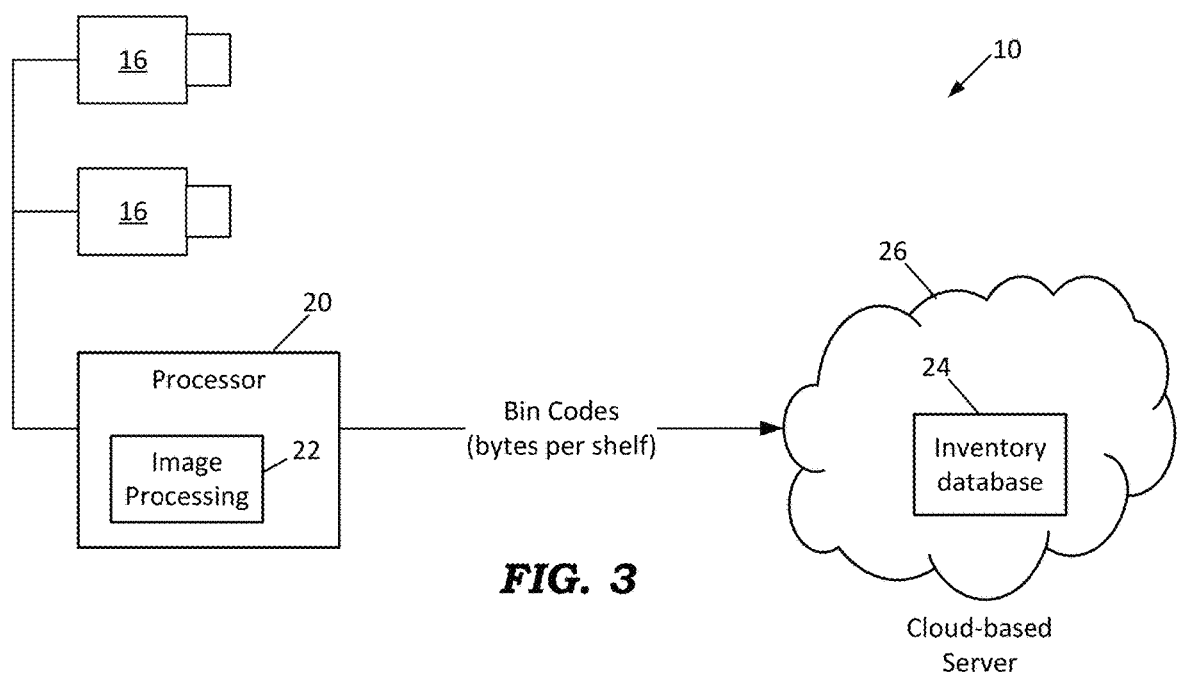
FIGS. 3 and 4 depict block diagrams of an inventory management system according to embodiments of the invention.
Figure 4:
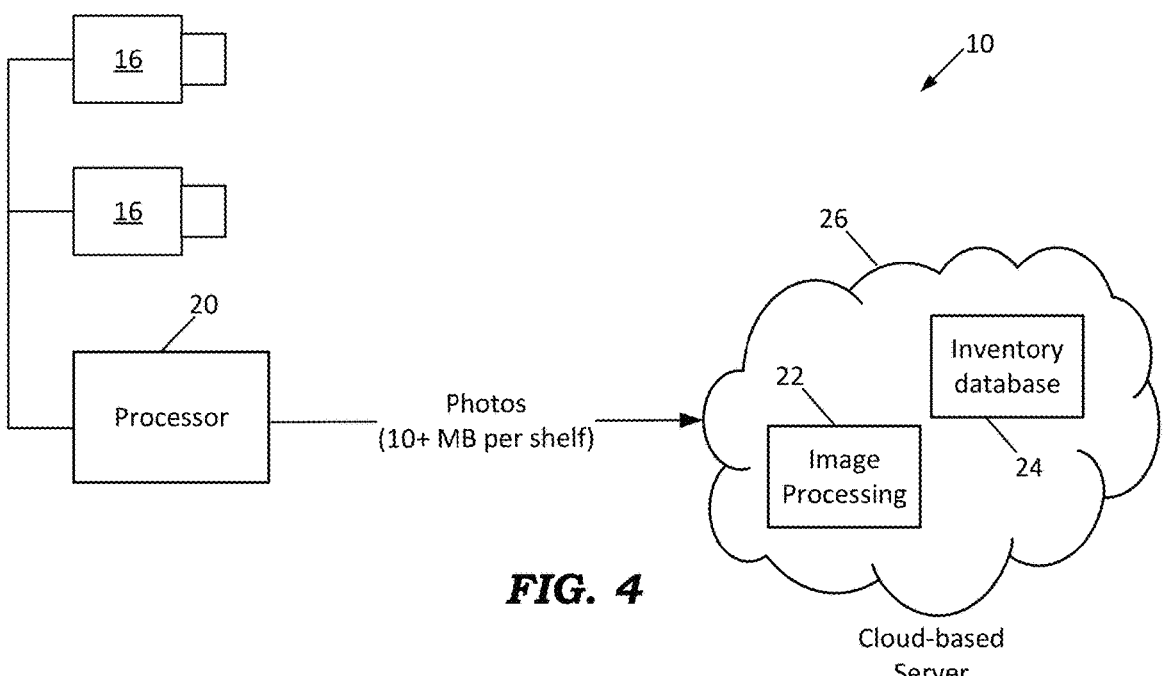

In a preferred embodiment, each bin code encodes a unique identification number identifying a particular supply item in an associative inventory database 24 that resides on a cloud-based server 26, such as depicted in FIGS. 3 and 4. If the field of view of the camera 16 is properly aligned with the shelving unit 12, and the bins are properly placed so that the bin codes 18a-18d are within the camera's field of view, images captured by the processor 20 will include the bin codes 18a-18d attached to the bins 14a-14d. Image processing software 22 processes the pixels in each captured image to find and decode the bin codes 18a-18d present therein. One example of such software 22 is barcode scanner software from Dynamsoft that is operable to detect multiple codes in a single image.

In a preferred embodiment, it is desirable to determine, based on one or more captured images, whether a bin has been placed on the top shelf 12a. For example, in the image depicted in FIG. 2, the image processing software 22 should identify four bin codes 18a, 18b, 18c, 18d, extract the encoded unique identification number for each, and assign an x-y coordinate location to each code based on x-y coordinates of image pixels associated with each of the codes.

In order to determine if any bins are on the top shelf 12a, it must first be determined where the top shelf is in relation to the locations of the bin codes 18a-18d detected in the image. In preferred embodiments, the top shelf 12a is identifiable in the captured image based on one or more optical top shelf codes attached to a forward-facing surface of the top shelf 12a. In a most preferred embodiment, there are two top shelf codes: a top shelf code 28L disposed at the left end of the top shelf 12a and a top shelf code 28R disposed at the right end, as shown in FIG. 2. The image processing software 22 identifies the left and right top shelf codes 28L and 28R and assigns a reference x-y coordinate location to each identified code based on x-y coordinates of image pixels associated with each of the top shelf codes 28L and 28R. For example, coordinates x=0, y=0 may be assigned to top shelf code 28L and coordinates x=48, y=0 may be assigned to top shelf code 28R. The equation of a straight line is y=mx+b, where m is the slope and b is the y-intercept. In this case wherein m=0 and b=0, the equation of a line through the locations of the top shelf codes 28L (x=0, y=0) and 28R (x=48, y=0) is simply y=0. In this example, any bin code having location coordinates in which the y coordinate component is a non-zero positive number is above the boundary line and thus above the top shelf 12a.

Figure 5:
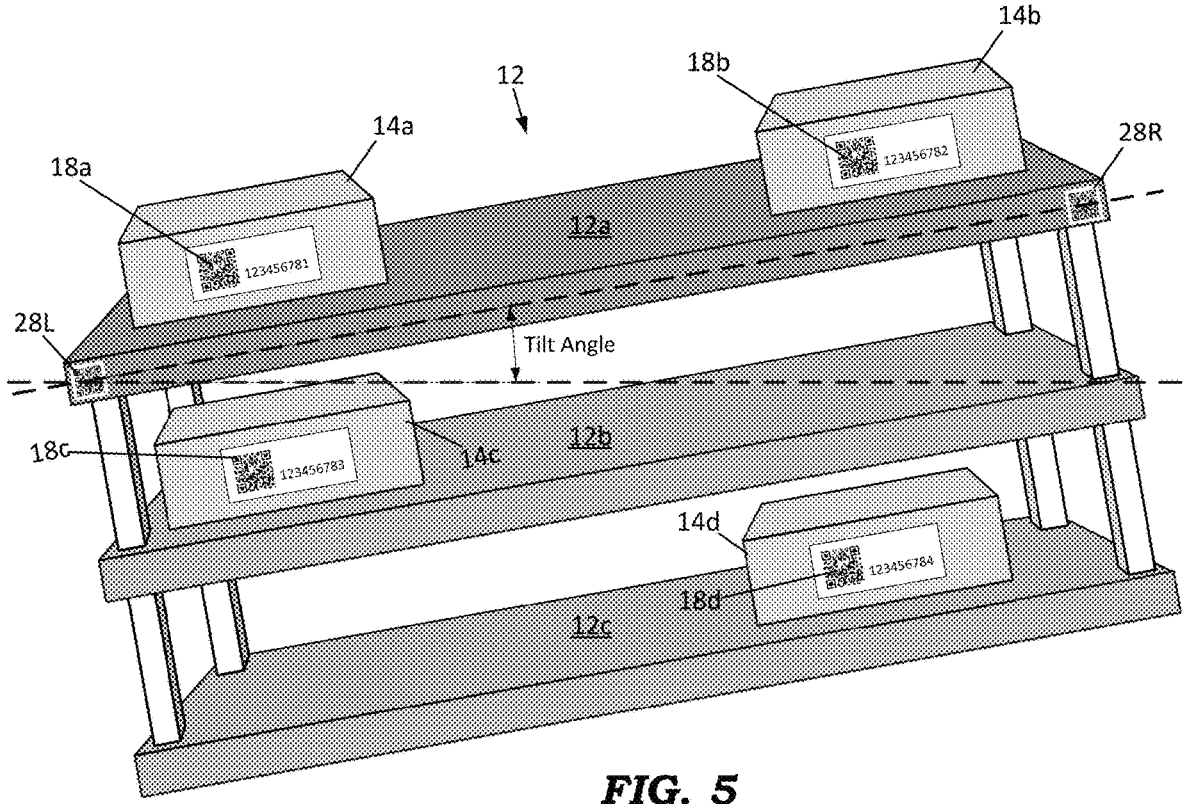
FIG. 5 depicts a physical configuration of an inventory management system according to an embodiment of the invention.

Now consider an example such as depicted in FIG. 5 in which the camera 16 is tilted with respect to the shelving unit 12 (or the shelving unit 12 is tilted with respect to the camera 16). Again, the image processing software 22 identifies the left and right top shelf codes 28L and 28R and assigns location x-y coordinates to each identified code based on x-y coordinates of image pixels associated with each of the codes 28L and 28R. For example, coordinates x=0, y=0 may be assigned to top shelf code 28L and coordinates x=46, y=8 may be assigned to top shelf code 28R. In this case, the slope m=8÷46=0.174, and the y-intercept b=zero, in which case the equation of the boundary line passing through the top shelf codes 28L and 28R is:

$$y = mx + b,$$
$$y = 0.174x + 0,.$$
$$y = 0.174x$$

In this example, if a bin code has location coordinates defining a point that is above the boundary line passing through the top shelf codes 28L and 28R as defined by the equation y=0.174x, the location of the bin code is above the top shelf 12a. In other words, a bin code is located above the top shelf 12a if the shortest distance between the location of the bin code and the boundary line passing through the top shelf codes 28L and 28R is a non-zero positive number.

Determining whether the bin code is located above or below the top shelf 12a may be done as follows. Given a line y=mx+b and a point $(x_3, y_3)$ at which the bin code is located, substitute the point's x value (i.e., $x_3$) into the equation of the line (i.e., $y=m \times x_3+b$) and solve for y. The relationship between the point's y value (i.e., $y_3$) and the y value (computed in the preceding step) determines whether the point is above or below the line.

It will be appreciated that the relationship condition ($y_3 > y$ or $y_3 < y$) is determined based on the location of the origin. As depicted in FIG. 9, in normal algebra in the positive quadrant (Quadrant I), the origin is in the bottom left. In image processing, the origin is frequently in the top left, such that lower y values are above higher y values. In normal algebra, higher y values are above lower y values.

In a preferred embodiment, the following programming code is used for the above-described calculations.

```
private static bool IsAboveLine(double x1, double y1,
double x2, double y2, double x3, double y3)

{
  // slope of the line
  double m = (y2 − y1) / (x2 − x1);
```

-continued

```
// y-intercept of the line
double b = y1 − (m * x1);
// y-coordinate of the point when plugged into the equation of the line
double y = (m * x3) + b;
// check if the point is above or below the line
if (y3 > y)
{
  return false;
}
else
{
  return true;
}
}
```

In some embodiments, if only one of the shelf top codes 28L and 28R is detected in the image, the top right and top left points of the code can be used to construct a boundary line corresponding to the position of the top shelf 12a. In some embodiments, unique identification information encoded in the top shelf codes is used to identify the shelving unit 12 and its location within an inventory room or storage facility.

In some embodiments the top shelf codes may also be used to confirm the camera 16 is working properly, and to tune the camera setup, such as by adjusting the focus, zoom level, tilt angle, and other settings. This setup operation may also include computing an estimated distance to each of the top shelf codes.

In some embodiments, a top shelf code comprises a color code, wherein a certain color is associated with and identifies the top shelf 12a of the shelving unit 12. In some embodiments, a top shelf code comprising a color code may have an elongate shape that stretches horizontally across a substantial portion of a front edge of the top shelf.

In some embodiments, a light source is included to illuminate the replenishment signaling area in which empty bins should be placed on the top shelf 12a. Alternatively, LEDs may be attached to the top shelf 12a to indicate the location of the landing zone.

In the embodiment of the system 10 depicted in FIG. 3, the image processing software runs on the processor 20 connected to the one or more cameras 16. The connection between the one or more cameras 16 and the processor 20 may be wired or wireless. In the embodiment of FIG. 3, the data transferred from the processor 20 across the communication network to the cloud-based server 26 generally comprises non-image data, such as product identification numbers and location coordinates associated with bin codes. The data in this case would be on the order of a few bytes per shelf. In an alternative embodiment depicted in FIG. 4, the image processing software runs on the cloud-based server 26. In this embodiment, the data transferred from the processor 20 across the communication network to the cloud-based server 26 comprises image data captured by the one or more cameras 16. The data in this case would be on the order of hundreds of kilobytes per shelf, and will vary depending on the type of the camera(s) 16 employed.

According to various embodiments, images are pulled from the camera 16 or are pushed from the camera 16 to the processor 20 or to the cloud-based server 26. Images may be pulled one at a time or pulled in various parallel processing configurations. In some embodiments, image processing and enhancing mechanisms may be utilized to improve the accuracy of the system 10, such as focus shifting, image stacking, etc.

The system described herein can also be used in situations in which there are two or more distinct inventory areas on a shelf for each product, and each of the inventory areas include an optically encoded element that may be placed on the top shelf when stock in the corresponding inventory area is depleted. For example, some inventory items are not compatible with placement in bins due to their size or shape. In those situations, the inventory items may be placed within distinct inventory areas on the shelf, along with an optically encoded "bookend," card, sliding panel, or other structure that identifies each of the distinct inventory areas.

Figure 7A:
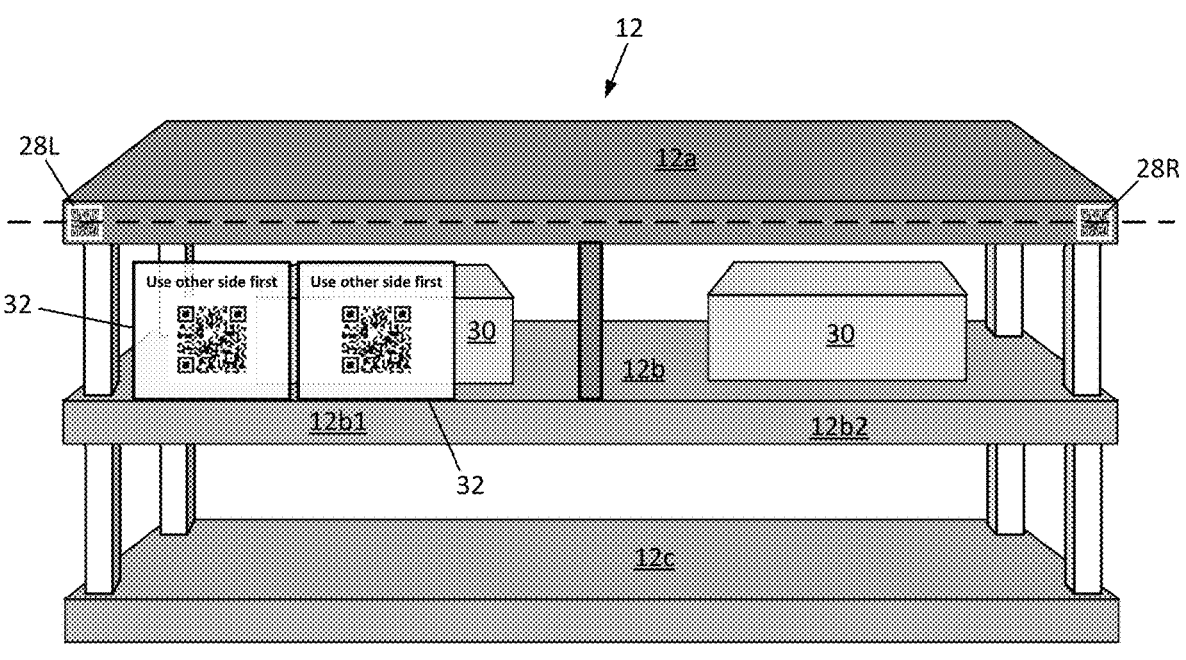
FIGS. 7A, 7B and 7C depict a physical configuration of an inventory management system according to an embodiment of the invention.
Figure 7B:
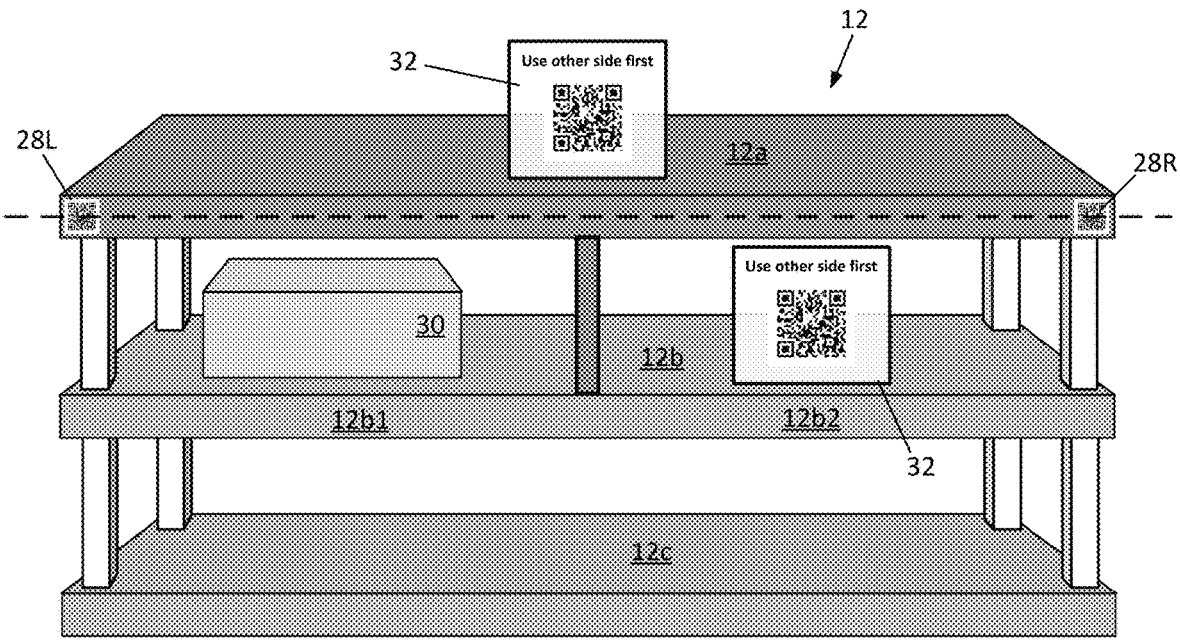
Figure 7C:
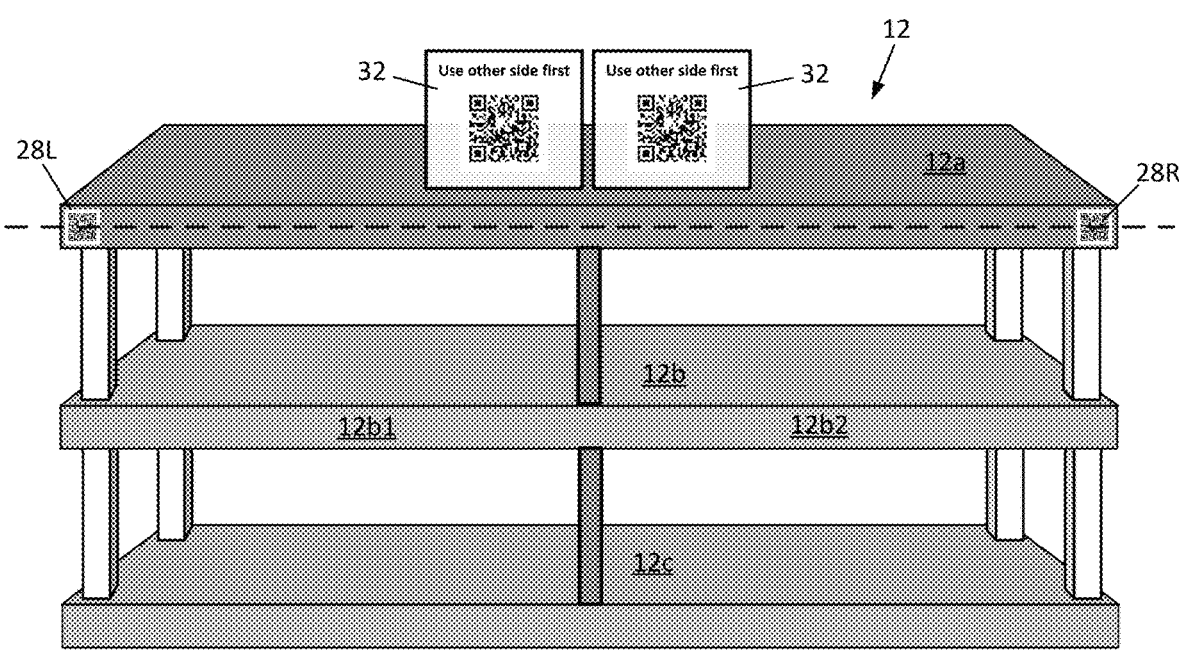

FIGS. 7A-7C depict a shelving unit 12 that includes two distinct inventory areas 12b1 and 12b2 of shelf 12b for holding the same type of product, and two bookend codes 32 each associated with a corresponding one of the inventory areas. As shown in FIG. 7A, when both distinct inventory areas contain stock of the product, both bookend codes 32 are placed on one side, and stock is accessed from the other side until it is depleted. As shown in FIG. 7B, when stock of the product in area 12b2 has been depleted, one of the bookend codes 32 is placed on the top shelf 12a as a replenishment signal and the other bookend code 32 is placed within the depleted area 12b2. As shown in FIG. 7C, when stock of the product in area 12b1 has also been depleted, both of the bookend codes 32 are placed on the top shelf 12a. Thus, the bookend codes 32 of this embodiment provide the same replenishment signal function in the resupply process as the bin codes of other embodiments.

In an alternative embodiment, a coded element may automatically become visible on the top shelf 12a when a user does something to indicate a distinct inventory area is empty. For example, moving a sliding panel from covering one distinct inventory area to covering another distinct inventory area could cause a coded card on the top shelf 12a to move from a horizontal position to a vertical position so as to become visible to the camera 16.

Some embodiments include features that enhance the readability of an optical code so that the image processing software 22 will have a higher rate of success in detecting and properly decoding a code within an image being processed. These features may include one or more of:
  using less reflective label stock on which the optical codes are printed;
  using less reflective ink for printing the optical codes;
  using a lower density code;
  using a larger code size;
  providing more white space around the code;
  using infrared responsive ink to improve detection in low light conditions;
  providing a protective coating over the printed code to extend its life;
  using a protective coating that is less reflective so as to not interfere with image processing.

In all Kanban inventory systems (manual, semi-manual, or automated), a common problem is double ordering. Double ordering occurs when the event that triggered the order triggers the order a second time. For example, consider the following semi-manual scenario.
  1. An empty bin is placed on the top shelf.
  2. A user scans each bin on the top shelf using a handheld scanner which generates 15 orders for the needed supplies.
  3. A few hours later, 14 of the 15 ordered supplies are brought to the room, and 14 of the 15 bins are restocked and put back on lower shelves. One of the 15 bins is left on the top shelf.

4. The next day, a user scans each bin on the top shelf using a handheld scanner which generates an order. Because the bin from the previous day is still on top, a second order is generated for that bin.

5. The next day, both orders are filled resulting in twice as many of the supplies being delivered to the inventory location.

Another example involves an automated Kanban system having high-frequency (HF) RFID cards attached to each bin. The HF RFID cards have a very short reading range (i.e., a few inches). When a bin is empty, a user removes the card from the bin and places the card on a board that is equipped with an HF RFID reader. Once a day an order is generated for any supplies for which corresponding HF RFID cards are on the board. Consider the following scenario involving such a system.

1. A user puts a card from an empty bin on the board at 3 pm on Monday.

2. An order for the supplies associated with the card is generated at 6 pm Monday.

3. The supplies are received at 10 am Tuesday.

4. The user restocks the bin but forgets to remove the card from the board.

5. Another order is generated at 6 pm Tuesday because the card is still on the board.

6. The supplies are received at 10 am Wednesday resulting in overstocking of the supplies associated with the card that was inadvertently left on the board.

The key to avoiding such problems is to know the state of each bin. Otherwise, if a bin is left on the top shelf (or an RFID card is left on the board) through multiple order cycles, orders will be generated each time.

In a preferred embodiment of the system 10, three possible states are always known for each distinct inventory area, such as each bin:

OnShelf;

OnTop; and

OnOrder.

If a user has 10,000 bins, the system tracks 10,000 states (one for each bin). Bins can only transition to other states in very specific ways, as illustrated in the state machine diagrams depicted in FIG. 6A (first embodiment) and FIG. 6B (second embodiment).

In the first embodiment (FIG. 6A), if a bin is in the OnShelf state 32, it can change to only the OnTop state 34. If a bin is in the OnTop state 34, it can change to either the OnShelf state 32 or the OnOrder state 36. If a bin is in the OnOrder state 36, it can change to only the OnShelf state 32. The act of transitioning from OnTop 34 to OnOrder 36 results in the generation of a replenishment signal that causes an order to be placed for the supplies associated with the bin. Because this transition can happen only once, regardless of how long the bin is left on the top shelf, supplies are ordered only once. A preferred embodiment of the system 10 implements transition controls to prevent transient errors from triggering false state transitions.

OnShelf to OnTop. It is very unlikely that a transient error condition would cause a bin to appear on the top shelf when the bin is not on the top shelf. No transition controls are needed for the OnShelf to OnTop state transition.

OnTop to OnShelf. Since it is very likely that a transient error could cause an optical code to not be seen in any given image, a preferred embodiment of the system 10 implements transition controls for this state transition. Examples of transient errors:

A person standing in front of the shelving unit 12 blocks the camera's view of one or more optical codes.

A transient change in lighting makes one or more optical codes temporarily unreadable.

Exemplary transition control: An optical code must not be detected on the top shelf in at least six consecutive images in at least 60 consecutive minutes before this state transition is allowed.

OnTop to OnOrder. Since it is very unlikely that any bin would be in the OnTop state due to an error condition, no transition controls are needed for the OnTop to OnOrder transition.

OnOrder to OnShelf. A preferred embodiment of the system 10 implements the same transition control for this state transition as are implemented for the OnTop to OnShelf transition.

Figure 6A:
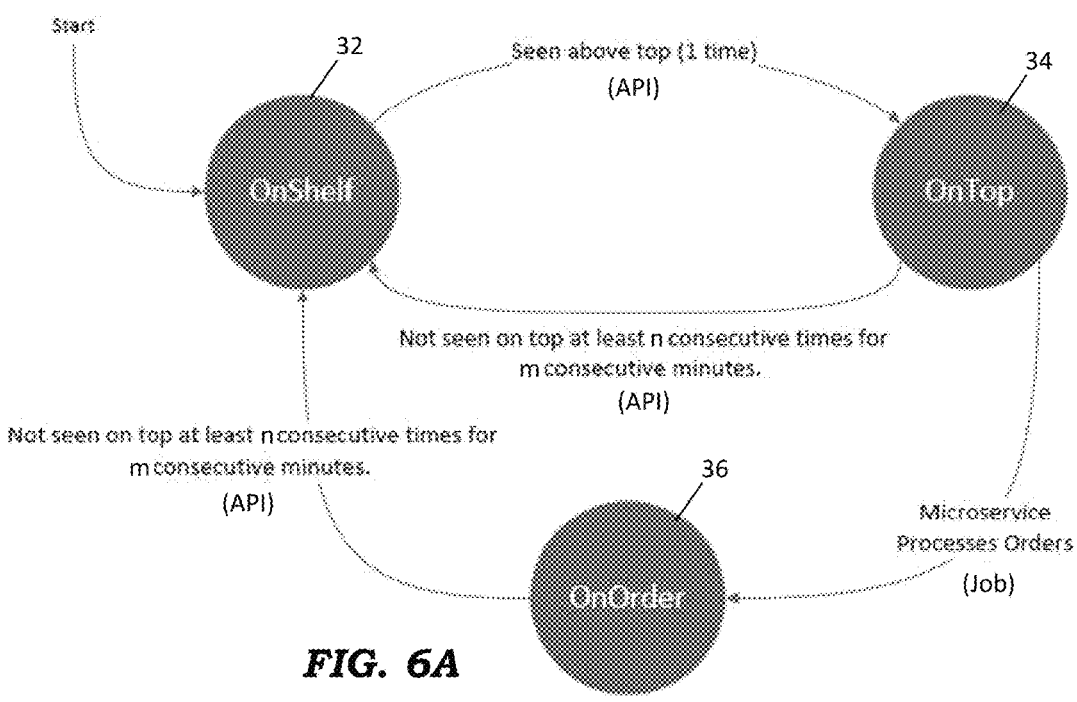
FIGS. 6A and 6B depict state machines of an inventory management system according to two embodiments of the invention.

Thus, as depicted in FIG. 6A, the state machine requires certain criteria to be met before a state transition is allowed. As discussed above, each distinct inventory area (such as a bin or a portion of a shelf) associated with an optical code is in one of the three states: OnShelf 32, OnTop 34, or OnOrder 36. The initial state of a distinct inventory area represented by a code is OnShelf. Whenever the code representing a distinct inventory area that is currently OnShelf is detected as being on the top shelf 12a, the state of that distinct inventory area transitions to OnTop. If the code representing a distinct inventory area that is OnTop ceases to be detected on the top shelf 12a for a configurable amount of time or number of consecutive times, the state of that distinct inventory area transitions to OnShelf. Periodically, the system processes orders by transitioning any distinct inventory area that is OnTop to OnOrder, and based on the transition, the system sends or queues a replenishment signal for that distinct inventory area. Optionally, the system may be configured to not immediately process distinct inventory areas that recently transitioned to OnTop (e.g., transitioned within the last 30 minutes).

If the code representing a distinct inventory area that is OnOrder ceases to be detected on the top shelf 12a for a configurable amount of time or number of consecutive times, the state of that distinct inventory area transitions to OnShelf. Since replenishment notifications are sent or queued based only on a distinct inventory area transitioning from OnShelf to OnOrder, any distinct inventory area that is OnOrder does not generate a new replenishment signal until after it has been removed from the top shelf 12a and placed back on one of the lower shelves.

With reference to FIG. 6A, following is an example of a possible state machine flow for a distinct inventory area, assuming m=6 and n=60:

State is OnShelf

. . .

Image 1: Detected→OnTop (update last time detected)

. . .

Image 48: Detected→N/A (update last time detected)

Order processed:→OnOrder

Image 49: Detected→N/A (update last time detected)

. . .

Bin is restocked (a human physically restocks the bin and puts it back on the lower shelf)

Image 550: Not Detected (count++)=1 (last time detected=10 min ago)→N/A

Image 551: Not Detected (count++)=2 (last time detected=20 min ago)→N/A

Image 552: Not Detected (count++)=3 (last time detected=30 min ago)→N/A

Image 553: Not Detected (count++)=4 (last time detected=40 min ago)→N/A

Image 554: Not Detected (count++)=5 (last time detected=50 min ago)→N/A

Image 555: Not Detected (count++)=6 (last time detected=59.9 min ago)→N/A

Image 556: Not Detected (count++)=7 (last time detected=69.9 min ago)→OnShelf

Figure 6B:
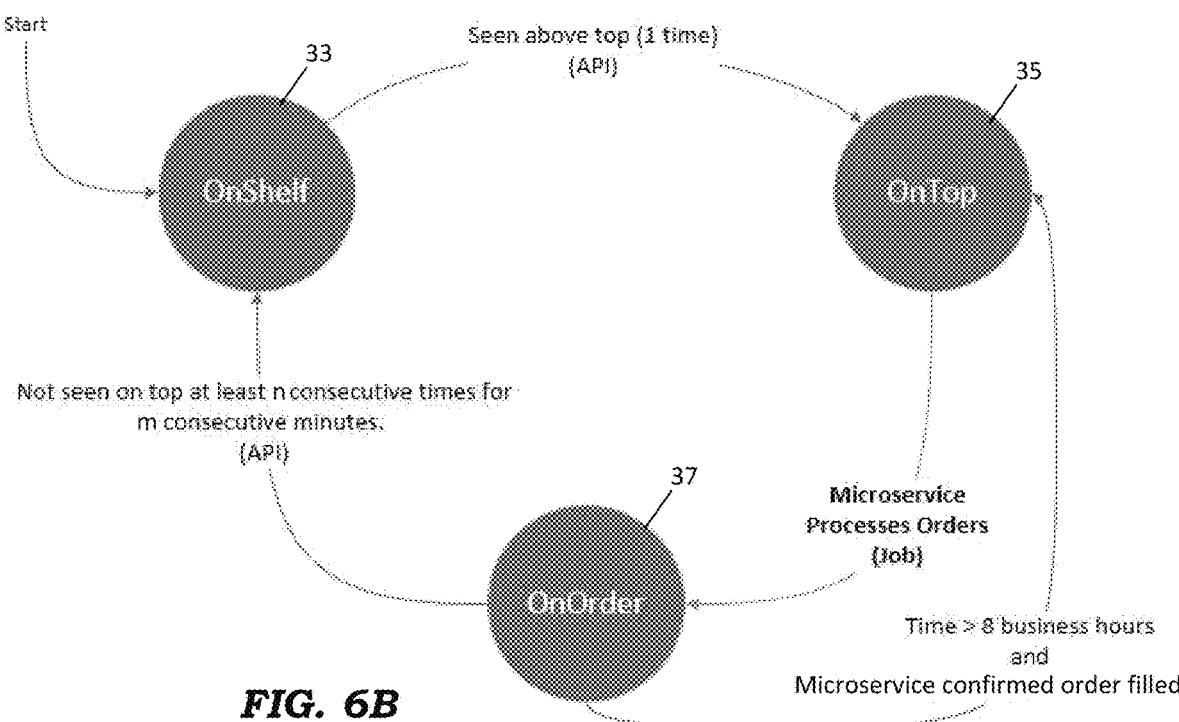

In the second embodiment of the state machine depicted in FIG. 6B, if a bin is in the OnShelf state 33, it can change only to the OnTop state 35. If a bin is in the OnTop state 35, it can transition only to the OnOrder state 37. If a bin is in the OnOrder state 37, it can change either to the OnShelf state 33 or back to the OnTop state 35. The act of transitioning from the OnTop state 35 to the OnOrder state 37 results in generation of a replenishment signal for the supplies associated with the bin. Under normal conditions, because this transition can happen only once regardless of how long the bin is left on the top shelf, supplies are ordered only once.

The transition from the OnOrder state 37 back to the OnTop state 35 in the second embodiment occurs if (1) the status of the associated line item in the reordering requisition is "filled", (2) more than some threshold level of time has passed, such as 8 or 24 hours, since the status of the associated line item in the reordering requisition was set to "filled", and (3) the bin for the reordered items is still detected as being on the top shelf. This transition from the OnOrder state 37 back to the OnTop state 35 compensates for problems that may occur in the resupply chain, such as described below.

Generally, once the reordering system has determined the status of each line item in a reordering requisition, the system sends an electronic message that includes the status of each reordered item, wherein the status is generally either filled, back ordered, or killed. A line item status of "filled" means there is sufficient stock in the inventory system to fill the quantity requested. In that case, it is expected that the associated bin will be removed from the top shelf, refilled, and replaced on a lower shelf within a certain expected time, such as 8 hours or 24 hours. If the expected time is exceeded, it is assumed that one of the following problems has occurred, in which case the associated item should be reordered:

the "two bin" problem has occurred, as described hereinafter;

the ordered item was somehow misappropriated on its way to the inventory location, such as by accidental delivery to the wrong inventory room or accidental shipment to another facility; or something else happened to the reordered item, and it is not expected to ever arrive in the correct inventory location.

The Two-Bin Problem

Figure 12A:
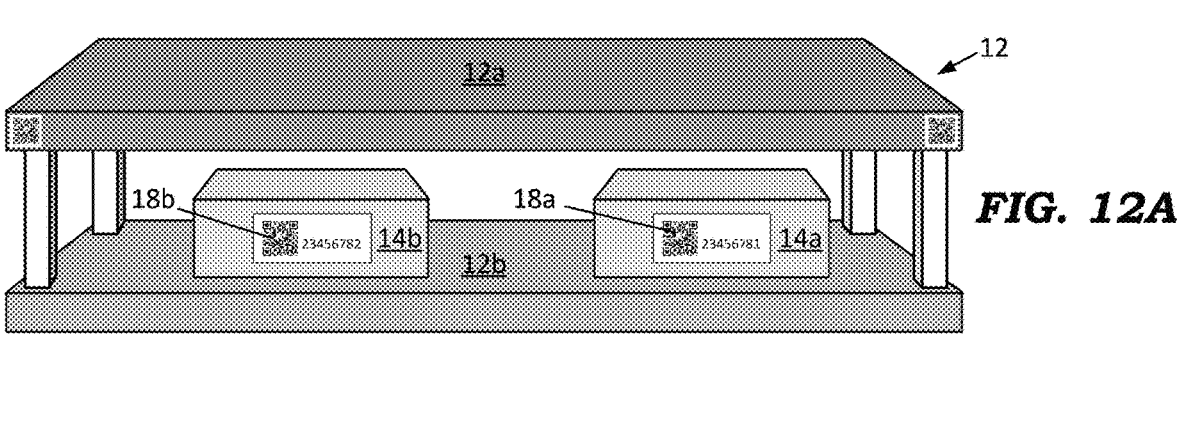
FIGS. 12A-12D depict a sequence of events referred to herein as the two-bin problem.
Figure 12B:
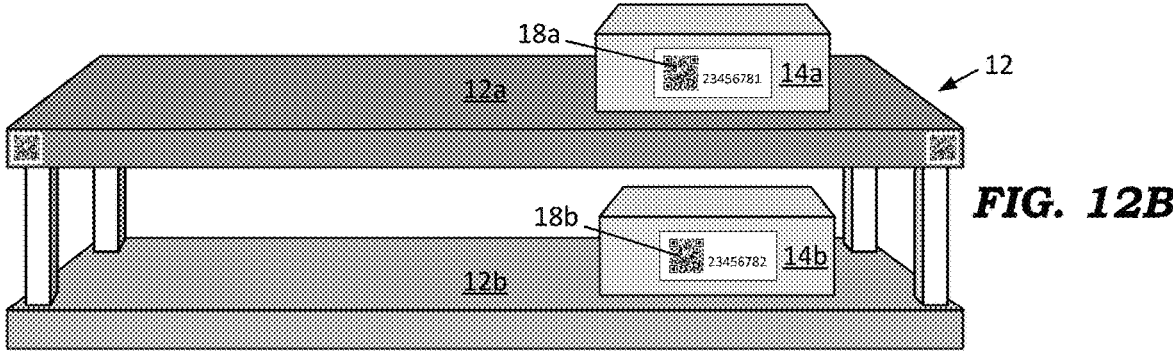
Figure 12C:
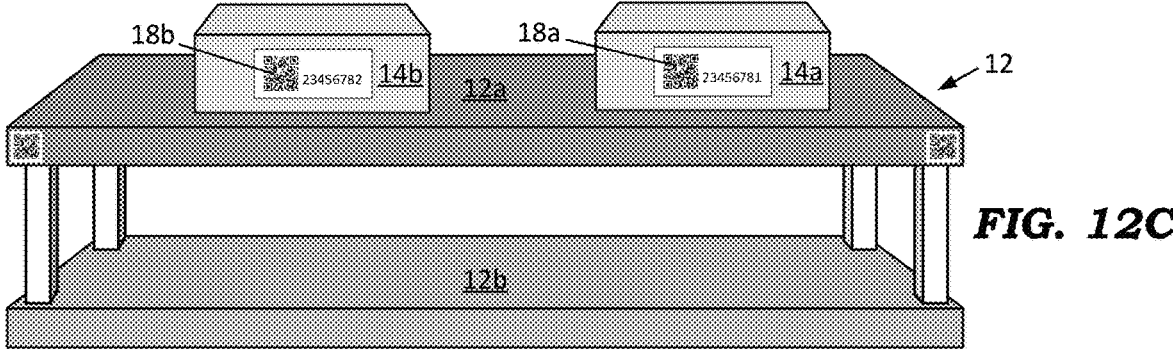
Figure 12D:
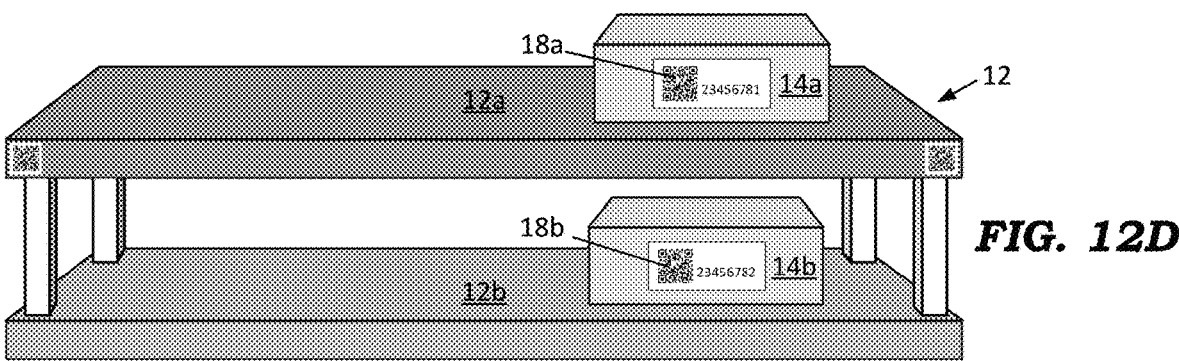

The "two-bin problem" refers to a sequence of events as depicted in FIGS. 12A-12D. The sequence begins with two bins 14a and 14b on a lower shelf 12b of a shelving unit 12 as shown in FIG. 12A, with both having a state of OnShelf in the state machine. Personnel have been instructed to use all the items in bin 14a before using any items in bin 14b. Once all the items in bin 14a have been used, the empty bin is placed on the top shelf 12a as shown in FIG. 12B. The state of bin 14a remains OnShelf until its code 18a is captured in an image generated by the camera 16, at which point the state of bin 14a changes to OnTop. After a programmed period of time has elapsed, the state of bin 14a transitions from OnTop to OnOrder and a replenishment signal is generated. This causes an order to be placed for the appropriate items to refill bin 14a. Some amount of time passes after placement of the order before the ordered items are delivered to the inventory location where shelving unit 12 is located and personnel restock the bin. After bin 14a was placed on the top shelf 12a, personnel began using items from bin 14b. At some point in time before bin 14a is restocked, bin 14b is emptied and placed on the top shelf 12a, as shown in FIG. 12C. The state of bin 14b remains OnShelf until its code 18b is captured in an image generated by the camera 16, at which point the state of bin 14b changes to OnTop. Before camera 16 captures an image showing bin 14b on the top shelf, the items ordered to refile bin 14a arrive in the inventory room, and personnel mistakenly put those items in bin 14b instead of bin 14a, and place bin 14b back onto the lower shelf 12b as shown in FIG. 12D. The state of bin 14a remains OnOrder until its code 18b is constantly not present in a captured image generated by the camera 16 as described above, at which point the state of bin 14a changes to OnShelf. Since bin 14b was never captured in an image showing bin 14b on the top shelf, the state of bin 14b remains OnShelf and a replenishment signal is not generated for bin 14b. At this point, because bin 14a is still on the top shelf 12a, its state is still OnOrder although the system reorder status is "filled." In this situation, the system has basically degraded into a one-bin Kanban system, and human intervention will be needed to resolve the problem.

Figure 8:
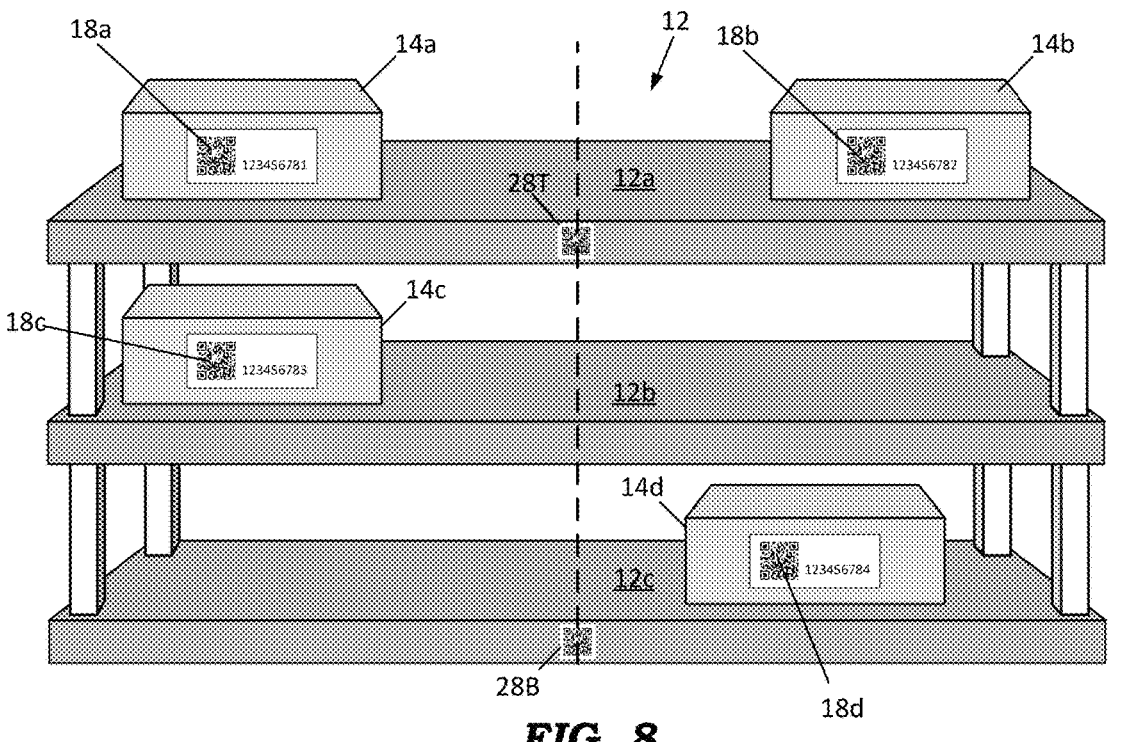
FIG. 8 depicts a physical configuration of an inventory management system according to an alternative embodiment of the invention.

In some embodiments, it may be desirable to determine whether an optically encoded object, such as a bin, is disposed to the left or right of a vertical boundary line. In one such embodiment depicted in FIG. 8, vertically-aligned shelf codes are provided, such as a top shelf code 28T disposed on the top shelf 12a and a bottom shelf code 28B disposed on the bottom shelf 12c. The image processing software 22 identifies the top and bottom shelf codes 28T and 28B and assigns a reference x-y coordinate location to each identified code based on x-y coordinates of image pixels associated with each of the top shelf codes 28T and 28B. For example, coordinates x=24, y=0 may be assigned to the top shelf code 28T and coordinates x=24, y=−24 may be assigned to the bottom shelf code 28B, wherein the vertical boundary line passing through the two codes is defined by the equation x=24. Distinct inventory areas could be defined to occupy portions of the shelves either to the right (x>24) or to the left (x<24) of the vertical boundary line.

Those of ordinary skill in the art will appreciate that various embodiments of the system may employ other positions of shelf codes to also construct diagonal boundary lines, and combinations of horizontal, vertical and diagonal boundary lines. It should also be appreciated that such boundary lines need not be straight but could be curved in various and complex orientations to accomplish desired Kanban inventory replenishment functions. A boundary line may also be defined by an equation of a rectangle, triangle, circle, or any other closed shape, wherein decisions are made regarding inventory replenishment based on whether an optically encoded structure is disposed inside or outside the closed boundary shape.

It will be appreciated that the image processing of optical codes is prone to errors. A code may be recognized in one image but not in the next. The m and n thresholds in the above example are a mechanism to compensate for the error in the image processing. Image processing errors could be caused by external environmental items (e.g., lighting level changes in the inventory room, humidity changes, etc.) or by external transitive items (e.g., a tall person standing in front of a shelving unit, a worker temporarily placing a ladder in front of a shelving unit, etc.).

Another embodiment of the invention, as depicted in FIGS. 10A-10C and 11, is useful for goods that do not fit in bins, so that they need to be stored directly on a shelf. This embodiment includes an inventory shelving unit 12 having multiple shelves 12*a*, 12*b*, and 12*c*. The shelf 12*b* provides a first designated inventory storage area 12*b*1 in which a first supply of goods 30 is stored and a second designated inventory storage area 12*b*2 in which a second supply of goods 30 is stored (step 100 in FIG. 11). A slider panel 38 is operable to slide between a first position and a second position (step 102). When moved to the first position (step 110), the slider panel 38 allows access to the first supply of goods 30 in the first inventory storage area 12*b*1 and blocks access to the second supply of goods 30 in the second inventory storage area 12*b*2. When moved to the second position (step 110), the slider panel 38 allows access to the second supply of goods 30 in the second inventory storage area 12*b*2 and blocks access to the first supply of goods 30 in the first inventory storage area 12*b*1.

Figure 10A:
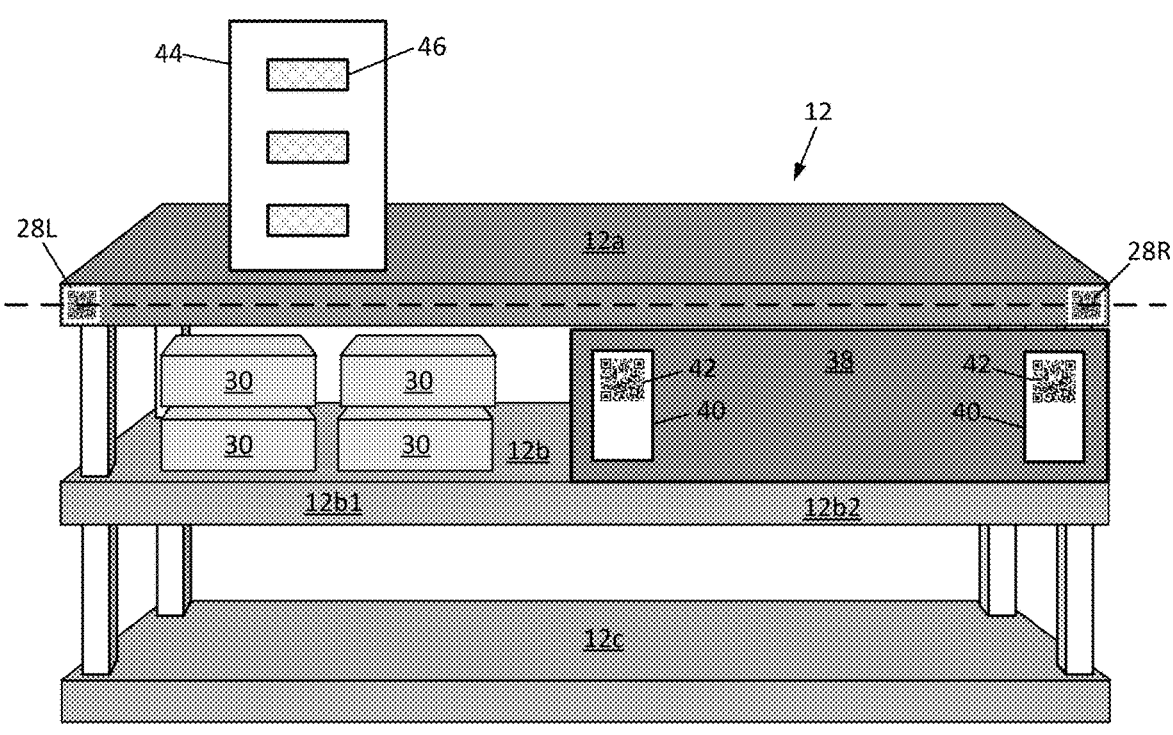
FIGS. 10A, 10B and 10C depict a physical configuration of an inventory management system according to another embodiment of the invention.

Removably attached to the slider panel 38 are first and second moveable structures 40 (step 104). In a preferred embodiment, the moveable structures 40 are labels that are attached to the slider panel 38 by an attachment mechanism 46, such as a hook-and-loop mechanism, a magnetic mechanism, or a snap mechanism. Printed on or otherwise applied to the movable structures are optical codes 42. In a preferred embodiment, the optical codes 42 encode a unique identification number that identifies the particular type of goods 30 in the associative inventory database 24 that resides on the cloud-based server 26 (FIGS. 3 and 4). Initially, when the first and second supplies of goods 30 are both present in the first and second inventory storage areas 12*b*1 and 12*b*2, the moveable structures 40 containing the optical codes 42 are both attached to the slider panel 38, as shown in FIG. 10A (step 106).

Figure 10B:
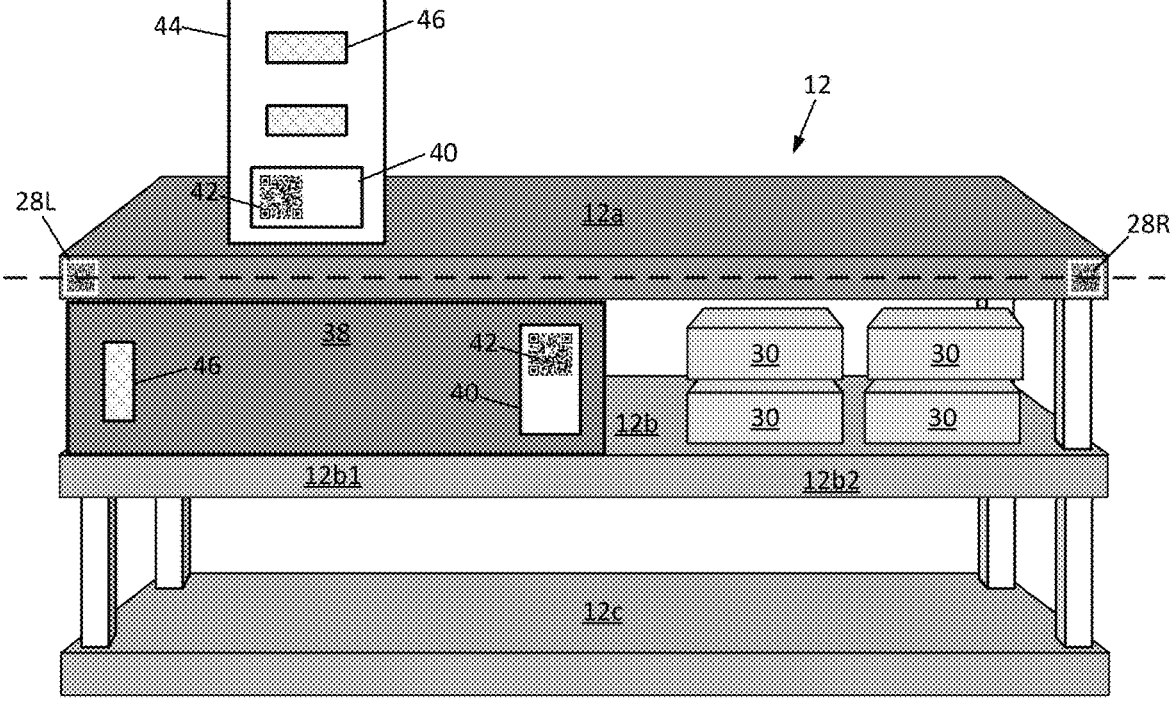
Figure 10C:
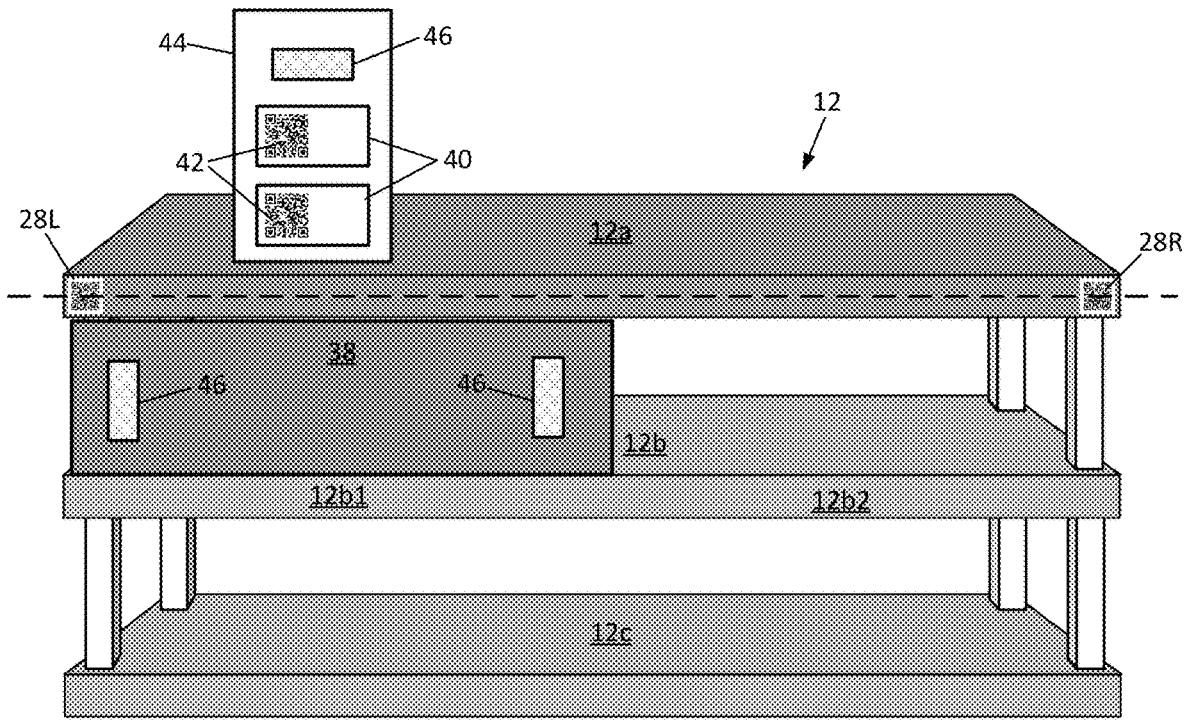

In this embodiment, the top shelf 12*a* of the shelving unit 12 is the replenishment signaling area (step 108), in which the placement of either of the moveable structures 40 containing the optical codes 42 causes generation of a replenishment signal. Thus, when the first supply of goods 30 in the first inventory storage area 12*b*1 on the shelf 12*b* has been depleted, a user detaches one of the moveable structures 40 from the slider panel 38 and places it on the top shelf 12*a*, as shown in FIG. 10B (step 112). The slider panel 38 is then moved to provide access to the second inventory storage area 12*b*2 on the shelf 12*b* (step 110). When the second supply of goods 30 in the second inventory storage area 12*b*2 has been depleted, the user detaches the remaining moveable structure 40 from the slider panel 38 and places it on the top shelf 12*a*, as shown in FIG. 10C (step 112).

To ensure that the optical codes 42 on the moveable structures 40 are clearly visible and decodable in the images generated by the camera 16, the moveable structures 40 are preferably attached to the front surface of a vertical structure 44 on the top shelf 12*a*. For example, the vertical structure 44 may be similar to the bookend structure 32 described previously. The vertical structure 44 may be permanently attached to the top shelf 12*a* or it may be detachable. In a preferred embodiment, the vertical structure 44 includes at least two attachment mechanisms 46 for removably attaching at least two of the moveable structures 40 thereto.

The operation of the camera 16 and the software that determines the boundary line of the replenishment signaling area, determines the spatial relationship between the boundary line and the optical codes 42, and generates replenishment notifications (steps 114-128 in FIG. 11) is substantially the same for this embodiment as was described above for other embodiments.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An apparatus for monitoring and replenishing an inventory of goods disposed within an inventory storage space that includes a multi-shelf shelving unit having a top shelf and one or more lower shelves below the top shelf, the apparatus comprising:

a first inventory area on one of the one or more lower shelves of the multi-shelf shelving unit within the inventory storage space, the first inventory area configured to store a first supply of goods;

a second inventory area on one of the one or more lower shelves of the multi-shelf shelving unit within the inventory storage space, the second inventory area configured to store a second supply of the goods;

a slider panel disposed within the inventory storage space and adjacent to the first and second inventory areas, the slider panel configured to be moveable between at least:

a first position in which the slider panel allows access to the first inventory area and blocks access to the second inventory area; and a second position in which the slider panel allows access to the second inventory area and blocks access to the first inventory area;

a first movable structure removably attached to the slider panel;

a first optical code disposed on the first movable structure, the first optical code encoding a unique identification number that identifies the goods in the first supply of goods;

a second movable structure removably attached to the slider panel;

a second optical code disposed on the second movable structure, the second optical code encoding the unique identification number that identifies the goods in the second supply of goods;

a replenishment signaling area on the top shelf of the multi-shelf shelving unit within the inventory storage space, the replenishment signaling area configured to receive the first movable structure that is placed therein after the first supply of the goods stored in the first inventory area has been depleted, and configured to receive the second movable structure that is placed therein after the second supply of the goods stored in the second inventory area has been depleted;

one or more boundary optical codes disposed adjacent to a boundary of the replenishment signaling area, the one or more boundary optical codes comprising:

a first boundary optical code attached to the shelving unit adjacent a first end of the top shelf; and a second boundary optical code attached to the shelving unit adjacent a second end of the top shelf opposing the first end;

one or more cameras that each have a field of view at least partially encompassing the replenishment signaling area and the first and second boundary optical codes, the one or more cameras for generating images of the replenishment signaling area and the first and second boundary optical codes; and one or more processors in electrical communication with the one or more cameras, the one or more processors operable to execute programmed instructions to:

detect the first and second boundary optical codes present within the images generated by the one or more cameras;

assign location coordinates to the first and second boundary optical codes detected within the images generated by the one or more cameras;

based on the location coordinates of the first and second boundary optical codes, determine an equation of a boundary line that defines the boundary of the replenishment signaling area, wherein the boundary line coincides with the location coordinates assigned to the first and second boundary optical codes;

detect the first optical code present within the images generated by the one or more cameras;

assign location coordinates to the first optical code detected within the images generated by the one or more cameras;

based on the location coordinates of the first optical code, determine a spatial relationship between a location of the first optical code and the boundary line; and generate a first replenishment notification based at least in part on the location coordinates of the first optical code indicating that the first optical code is above the boundary line, wherein the first replenishment notification indicates that the first supply of the goods in the first inventory area needs to be replenished.

2. The apparatus of claim 1 wherein the one or more processors are further operable to execute programmed instructions to:

detect the second optical code present within the images generated by the one or more cameras;

assign location coordinates to the second optical code detected within the images generated by the one or more cameras;

based on the location coordinates of the second optical code, determine a spatial relationship between a location of the second optical code and the boundary line; and generate a second replenishment notification based at least in part on the location coordinates of the second optical code indicating that the second optical code is above the boundary line, wherein the second replenishment notification indicates that the second supply of the goods in the second inventory area needs to be replenished.

3. The apparatus of claim 1 further comprising a substantially vertical structure disposed above the boundary line and within the field of view of the one or more cameras, and wherein:

the first movable structure comprises a first label on which the first optical code is disposed, wherein the first label is removably attachable to the slider panel and removably attachable to the vertical structure; and the second movable structure comprises a second label on which the second optical code is disposed, wherein the second label is removably attachable to the slider panel and removably attachable to the vertical structure.

4. The apparatus of claim 3 wherein the substantially vertical structure and the slider panel include one or more attachment mechanisms for removably attaching one or both of the first label and the second label to the vertical structure and the slider panel, the one or more attachment mechanisms comprising one or more of a hook-and-loop mechanism, a magnetic mechanism, and a snap mechanism.

5. The apparatus of claim 1 wherein the one or more processors execute the programmed instructions to determine the equation of the boundary line to comprise one or more of a horizontal line, a vertical line, a diagonal line, a curved line, and a line forming a closed shape.

6. The apparatus of claim 1 wherein the one or more processors execute the programmed instructions to determine the equation of the boundary line as intersecting the location coordinates of the first and second boundary optical codes.

7. The apparatus of claim 1 wherein the first and second optical codes comprise QR codes or barcodes.

8. The apparatus of claim 1 wherein the first and second boundary optical codes comprise QR codes, barcodes, or color codes.

9. The apparatus of claim 1 wherein the one or more cameras comprise one or more of a camera mounted on a ceiling, a camera mounted on a horizontal or vertical track system, an infrared camera, and a camera having remotely-adjustable zoom, tilt and pan.

10. The apparatus of claim 1 wherein at least one of the one or more processors is disposed in the inventory storage space.

11. The apparatus of claim 10 wherein at least one of the one or more processors is a cloud-based server that is in communication with the at least one processor disposed in the inventory storage space via a communication network.

12. The apparatus of claim 1 wherein the one or more processors execute the programmed instructions to:

decode one or both of the first and second optical codes to determine the unique identification number that identifies the goods, and generate the replenishment notification to include the unique identification number.

13. A method for monitoring and replenishing an inventory of goods disposed within an inventory storage space that includes a multi-shelf shelving unit, the method comprising:

(a) providing a first inventory area within the inventory storage space, the first inventory area configured to store a first supply of goods;

(b) providing a second inventory area within the inventory storage space, the second inventory area configured to store a second supply of the goods;

(c) providing a slider panel adjacent the first and second inventory areas within the inventory storage space;

(d) providing a first movable structure associated with the first inventory area, the first movable structure having a first optical code disposed thereon, the first optical code encoding a unique identification number that identifies the goods;

(e) removably attaching the first movable structure to the slider panel;

(f) providing a replenishment signaling area within the inventory storage space, the replenishment signaling area configured to receive the first movable structure;

(g) moving the slider panel to a first position in which the slider panel provides access to the first supply of goods in the first inventory area and blocks access to the second supply of goods in the second inventory area;

(h) upon depletion of the first supply of the goods from in the first inventory area, removing the first movable structure from the slider panel and placing the first movable structure in the replenishment signaling area;

(i) providing first and second boundary optical codes adjacent to a boundary of the replenishment signaling area, wherein the first boundary optical code is attached to the shelving unit adjacent a first end of the top shelf and the second boundary optical code is attached to the shelving unit adjacent a second end of the top shelf opposing the first end;

(j) providing one or more cameras that each have a field of view at least partially encompassing the replenishment signaling area and the first and second boundary optical codes;

(k) using the one or more cameras, periodically generating images that encompass the replenishment signaling area and the first and second boundary optical codes;

(l) executing programmed instructions on one or more processors to detect the first and second boundary optical codes present within the images;

(m) executing programmed instructions on the one or more processors to assign location coordinates to the first and second boundary optical codes detected within the images;

(n) executing programmed instructions on the one or more processors to determine an equation of a boundary line that defines the boundary of the replenishment signaling area based on the location coordinates of the first and second boundary optical codes, wherein the boundary line coincides with the location coordinates of the first and second boundary optical codes;

(o) executing programmed instructions on the one or more processors to detect the first optical code present within the images;

(p) executing programmed instructions on the one or more processors to assign location coordinates to the first optical code detected within the images;

(q) executing programmed instructions on the one or more processors to determine a spatial relationship between a location of the first optical code and the boundary line based on the location coordinates of the first optical code; and (r) executing programmed instructions on the one or more processors to generate a replenishment notification based at least in part on the location coordinates of the first optical code indicating that the first optical code is above the boundary line, wherein the replenishment notification indicates that the first supply of the goods in the first inventory area needs to be replenished.

14. The method of claim 13 further comprising:

(s) providing a second movable structure associated with the second inventory area, the second movable structure having a second optical code disposed thereon, the second optical code encoding the unique identification number that identifies the goods;

(t) removably attaching the second movable structure to the slider panel;

(u) moving the slider panel to a second position in which the slider panel provides access to the second supply of goods in the second inventory area and blocks access to the first inventory area;

(v) upon depletion of the second supply of the goods stored in the second inventory area, removing the second movable structure from the slider panel, and placing the second movable structure into the replenishment signaling area;

(w) executing programmed instructions on the one or more processors to detect the second optical code present within the images;

(x) executing programmed instructions on the one or more processors to assign location coordinates to the second optical code detected within the images;

(y) executing programmed instructions on the one or more processors to determine a spatial relationship between a location of the second optical code and the boundary line based on the location coordinates of the second optical code; and (z) executing programmed instructions on the one or more processors to generate a replenishment notification based at least in part on the location coordinates of the second optical code indicating that the second optical code is above the boundary line, wherein the replenishment notification indicates that the second supply of the goods in the second inventory area needs to be replenished.

15. The method of claim 14 further comprising providing a substantially vertical structure disposed above the boundary line and within the field of view of the one or more cameras, wherein:

step (d) comprises providing a first label on which the first optical code is disposed, wherein the first label is removably attachable to the slider panel and removably attachable to the vertical structure; and step(s) comprises providing a second label on which the second optical code is disposed, wherein the second label is removably attachable to the slider panel and removably attachable to the vertical structure.

16. The method of claim 15 wherein the substantially vertical structure and the slider panel include one or more attachment mechanisms for removably attaching one or both of the first label and the second label to the vertical structure and the slider panel, the one or more attachment mechanisms comprising one or more of a hook-and-loop mechanism, a magnetic mechanism, and a snap mechanism.

17. The method of claim 13 wherein step (n) comprises executing the programmed instructions on the one or more processors to determine the equation of the boundary line to comprise one or more of a horizontal line, a vertical line, a diagonal line, a curved line, and a line forming a closed shape.

18. The method of claim 13 wherein step (n) comprises executing the programmed instructions on the one or more processors to determine the equation of the boundary line to intersect the location coordinates of the first and second boundary optical codes.

19. The method of claim 13 wherein the first and second optical codes comprise QR codes or barcodes.

20. The method of claim 13 wherein the first and second boundary optical codes comprise QR codes, barcodes, or color codes.

21. The method of claim 13 further wherein step (n) comprises providing the one or more cameras that include one or more of a camera mounted on a ceiling, a camera mounted on a horizontal or vertical track system, an infrared camera, and a camera having remotely adjustable zoom, tilt and pan.

22. An apparatus for monitoring and replenishing an inventory of goods disposed within an inventory storage space, the apparatus comprising:

a first distinct inventory area within the inventory storage space, the first distinct inventory area configured to store a supply of a first type of goods;

a first electronically detectable element disposed on a first movable structure associated with the first distinct inventory area, the first electronically detectable element encoding a first unique identification number that identifies the first type of goods;

a replenishment signaling area within the inventory storage space, the replenishment signaling area configured to receive the first movable structure that is placed therein after the supply of the first type of goods stored in the first distinct inventory area has been depleted;

one or more detectors associated with the replenishment signaling area, the one or more detectors configured to detect the first electronically detectable element; and one or more processors in electrical communication with the one or more detectors, the one or more processors operable to execute programmed instructions to maintain a state machine representing a plurality of states of the first distinct inventory area, wherein the plurality of states include:

a first state in which the first electronically detectable element is not in the replenishment signaling area;

a second state in which the first electronically detectable element is in the replenishment signaling area; and a third state in which an order has been placed or is to be placed to replenish the supply of the first type of goods in the first distinct inventory area, wherein execution of the programmed instructions causes:

a transition from the first state to the second state based on the one or more detectors detecting the first electronically detectable element in the replenishment signaling area;

a transition from the second state to the third state and generation of a replenishment notification in association with the transition from the second state to the third state, wherein the replenishment notification indicates that the supply of the first type of goods in the first distinct inventory area needs to be replenished;

a transition from the third state to the first state based on the one or more detectors in the replenishment signaling area not detecting the first electronically detectable element in the replenishment signaling area for at least a predetermined period of time; and a transition from the third state to the second state based on:

(1) a line item of a reordering requisition associated with the first type of goods being designated as filled;

(2) passage of more than a threshold level of time after the line item of the reordering requisition associated with the first type of goods was designated as filled; and (3) the first electronically detectable element is still detected in the replenishment signaling area.

23. An apparatus for monitoring and replenishing an inventory of goods disposed within an inventory storage space that includes a multi-shelf shelving unit, the apparatus comprising:

a first inventory area disposed on at least one of the shelves of the multi-shelf shelving unit within the inventory storage space, the first inventory area configured to store a first supply of goods;

a second inventory area disposed on the at least one of the shelves of the multi-shelf shelving unit on which the first inventory area is disposed or on at least one of the shelves of the multi-shelf shelving unit other than the at least one of the shelves on which the first inventory area is disposed, the second inventory area configured to store a second supply of the goods;

a slider panel disposed within the inventory storage space and adjacent to the first and second inventory areas, the slider panel configured to be moveable between at least:

a first position in which the slider panel allows access to the first inventory area and blocks access to the second inventory area; and a second position in which the slider panel allows access to the second inventory area and blocks access to the first inventory area;

a first movable structure removably attached to the slider panel;

a first optical code disposed on the first movable structure, the first optical code encoding a unique identification number that identifies the goods in the first supply of goods;

a second movable structure removably attached to the slider panel;

a second optical code disposed on the second movable structure, the second optical code encoding the unique identification number that identifies the goods in the second supply of goods;

a replenishment signaling area disposed on a shelf of the multi-shelf shelving unit other than the at least one of the shelves on which the first inventory area is disposed and other than the at least one of the shelves on which the second inventory area is disposed, the replenishment signaling area configured to receive the first movable structure that is placed therein after the first supply of the goods stored in the first inventory area has been depleted, and configured to receive the second movable structure that is placed therein after the second supply of the goods stored in the second inventory area has been depleted;

one or more boundary optical codes disposed adjacent to a boundary of the replenishment signaling area, the one or more boundary optical codes comprising:

a first boundary optical code attached to the shelving unit adjacent a first end of the shelf on which the replenishment signaling area is disposed; and a second boundary optical code attached to the shelving unit adjacent a second end of the shelf on which the replenishment signaling area is disposed;

one or more cameras that each have a field of view at least partially encompassing the replenishment signaling area and the first and second boundary optical codes, the one or more cameras for generating images of the replenishment signaling area and the first and second boundary optical codes; and one or more processors in electrical communication with the one or more cameras, the one or more processors operable to execute programmed instructions to:

detect the first and second boundary optical codes present within the images generated by the one or more cameras;

assign location coordinates to the first and second boundary optical codes detected within the images generated by the one or more cameras;

based on the location coordinates of the first and second boundary optical codes, determine an equation of a boundary line that defines the boundary of the replenishment signaling area, wherein the boundary line coincides with the location coordinates assigned to the first and second boundary optical codes;

detect the first optical code present within the images generated by the one or more cameras;

assign location coordinates to the first optical code detected within the images generated by the one or more cameras;

based on the location coordinates of the first optical code, determine a first spatial relationship between a location of the first optical code and the boundary line; and generate a first replenishment notification based at least in part on the first spatial relationship indicating that the first optical code is within the replenishment signaling area, wherein the first replenishment notification indicates that the first supply of the goods in the first inventory area needs to be replenished.

24. The apparatus of claim 23 wherein the one or more processors are further operable to execute programmed instructions to:

detect the second optical code present within the images generated by the one or more cameras;

assign location coordinates to the second optical code detected within the images generated by the one or more cameras;

based on the location coordinates of the second optical code, determine a second spatial relationship between a location of the second optical code and the boundary line; and generate a second replenishment notification based at least in part on the second spatial relationship indicating that the second optical code is within the replenishment signaling area, wherein the second replenishment notification indicates that the second supply of the goods in the second inventory area needs to be replenished.

* * * * *